US008185538B2

(12) United States Patent
Delli Santi et al.

(10) Patent No.: US 8,185,538 B2
(45) Date of Patent: *May 22, 2012

(54) SYSTEM FOR DETERMINING THE GEOGRAPHIC RANGE OF LOCAL INTENT IN A SEARCH QUERY

(75) Inventors: Jim W. Delli Santi, Los Altos, CA (US); Ramazan Demir, South Pasadena, CA (US)

(73) Assignee: Yahoo! Inc., Sunnyvale, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 12/834,659

(22) Filed: Jul. 12, 2010

(65) Prior Publication Data

US 2010/0281011 A1    Nov. 4, 2010

Related U.S. Application Data

(63) Continuation of application No. 11/729,104, filed on Mar. 28, 2007, now Pat. No. 7,805,450.

(51) Int. Cl.
*G06F 7/00* (2006.01)
*G06F 17/30* (2006.01)

(52) U.S. Cl. ...................................................... 707/754

(58) Field of Classification Search .................. None
See application file for complete search history.

(56) References Cited

U.S. PATENT DOCUMENTS

| | | | |
|---|---|---|---|
| 5,583,763 A | 12/1996 | Atcheson et al. | |
| 6,006,221 A | 12/1999 | Liddy et al. | |
| 6,076,088 A | 6/2000 | Paik et al. | |
| 6,102,969 A | 8/2000 | Christianson et al. | |
| 6,363,373 B1 | 3/2002 | Steinkraus | |
| 6,539,348 B1 | 3/2003 | Bond et al. | |
| 6,584,464 B1 | 6/2003 | Warthen | |
| 6,665,715 B1 | 12/2003 | Houri | |
| 6,675,159 B1 | 1/2004 | Lin et al. | |
| 6,772,150 B1 | 8/2004 | Whitman et al. | |
| 7,051,023 B2 | 5/2006 | Kapur et al. | |
| 7,376,714 B1 | 5/2008 | Gerken | |
| 2002/0143991 A1 | 10/2002 | Chow et al. | |
| 2002/0199018 A1 | 12/2002 | Diedrich et al. | |
| 2003/0074471 A1 | 4/2003 | Anderson et al. | |
| 2005/0003835 A1 | 1/2005 | Riise et al. | |
| 2005/0060430 A1 | 3/2005 | Riise et al. | |
| 2005/0108213 A1 | 5/2005 | Riise et al. | |
| 2005/0108244 A1 | 5/2005 | Riise et al. | |
| 2006/0004797 A1 | 1/2006 | Riise et al. | |
| 2006/0085392 A1 | 4/2006 | Wang et al. | |
| 2006/0106778 A1 | 5/2006 | Baldwin | |
| 2006/0149734 A1 | 7/2006 | Egnor et al. | |
| 2007/0027743 A1 | 2/2007 | Carson et al. | |
| 2007/0121845 A1 | 5/2007 | Altberg et al. | |
| 2007/0136140 A1 | 6/2007 | Smith, Jr. | |
| 2007/0233864 A1 | 10/2007 | Xie et al. | |
| 2008/0010270 A1 | 1/2008 | Gross | |
| 2008/0086368 A1 | 4/2008 | Bauman et al. | |
| 2008/0109277 A1 | 5/2008 | Hengel | |
| 2008/0114672 A1 | 5/2008 | Yahia et al. | |
| 2008/0189257 A1 | 8/2008 | Wiseman et al. | |
| 2008/0222119 A1 | 9/2008 | Dai et al. | |
| 2008/0243611 A1 | 10/2008 | Delli Santi et al. | |
| 2008/0243822 A1 | 10/2008 | Campbell et al. | |
| 2008/0244046 A1 | 10/2008 | Campbell et al. | |

*Primary Examiner* — Uyen T. Le

(74) *Attorney, Agent, or Firm* — Brinks Hofer Gilson & Lione

(57) ABSTRACT

A system and method determine the geographic range of a search query. A search query may include local intent which influences the results and advertisements that are displayed in response to the search query. The geographic range associated with the local intent may vary depending on the search query. The geographic range may be determined using probabilistic models that analyze historical searches to determine the geographic range of search queries.

20 Claims, 12 Drawing Sheets

SYSTEM FOR DETERMINING THE GEOGRAPHIC RANGE OF LOCAL INTENT IN A SEARCH QUERY

RELATED APPLICATIONS

The present application is a Continuation of application Ser. No. 11/729,104 now U.S. Pat. No. 7,805,450 issued on Sep. 28, 2010, entitled "SYSTEM FOR DETERMINING THE GEOGRAPHIC RANGE OF LOCAL INTENT IN A SEARCH QUERY," filed on Mar. 28, 2007, which is further related to applications entitled "SYSTEM AND METHOD FOR ASSOCIATING A GEOGRAPHIC LOCATION WITH AN INTERNET PROTOCOL ADDRESS," filed on Mar. 28, 2007, U.S. patent application Ser. No. 11/729,365; "SYSTEM AND METHOD FOR ASSOCIATING A GEOGRAPHIC LOCATION WITH AN INTERNET PROTOCOL ADDRESS," filed on Mar. 28, 2007, U.S. patent application Ser. No. 11/729,364; "SYSTEM AND METHOD FOR ASSOCIATING A GEOGRAPHIC LOCATION WITH AN INTERNET PROTOCOL ADDRESS," filed on Mar. 28, 2007, U.S. patent application Ser. No. 11/729,377; "SYSTEM FOR PROVIDING GEOGRAPHICALLY RELEVANT CONTENT TO A SEARCH QUERY WITH LOCAL INTENT," filed on Mar. 28, 2007, U.S. patent application Ser. No. 11/729,103, now U.S. Pat. No. 7,774,348 issued on Aug. 10, 2010; "SYSTEM FOR DETERMINING LOCAL INTENT IN A SEARCH QUERY," filed on Mar. 28, 2007, U.S. patent application Ser. No. 11/729,096, now U.S. Pat. No. 7,788,252 issued on Aug. 31, 2010; each of which is incorporated by reference.

BACKGROUND

Online advertising may be an important source of revenue for enterprises engaged in electronic commerce. A number of different kinds of web page based online advertisements are currently in use, along with various associated distribution requirements, advertising metrics, and pricing mechanisms. Processes associated with technologies such as Hypertext Markup Language (HTML) and Hypertext Transfer Protocol (HTTP) enable a web page to be configured to contain a location for inclusion of an advertisement. A page may not only be a web page, but any other electronically created page or document. An advertisement can be selected for display each time the page is requested, for example, by a browser or server application.

Online advertising may be linked to online searching. Online searching is a very common way for consumers to locate information, goods, or services on the Internet. A consumer may use an online search engine to type in one or more keywords to search for other pages or web sites with information related to the keyword(s). The advertising that is shown on the search engine page may be related to the keyword(s). In particular, a search results page may be displayed, which may include the search results, as well as advertisements, related to the keyword(s) that produced the search results.

The advertisements related to search results shown as a search engine page, or based on content from other pages may be targeted to the consumer viewing the page. In particular, advertisers would like for their advertisements to be shown to those consumers who would be most likely to select the advertisement and to view the advertiser's page, or purchase the advertiser's goods or services. Accordingly, the advertising provider, such as a search engine, may attempt to determine the intent of consumers when those consumers view or interact with a web page.

Consumers use the Internet and search engines to find information and make decisions among online entities such as websites, online companies, or online services, independent of geographic constraints. For example, online retailers may provide goods or services to any location in the United States. Accordingly, contextual relevancy plays a role in driving economic value by helping consumers make decisions in their online lives. For example, the Internet may be used to help consumers find useful online services, online merchants and online information. In addition, the Internet is evolving into a type of informational utility that helps consumers make important local or geographic-specific decisions in their offline lives as well. Consumers are turning to the Internet for services that help them manage more of their day-to-day offline activities and needs.

A search engine may attempt to determine the intent of a consumer who just performed a search. In one example, the intent that is analyzed may be geographic, such as for a search for the keyword "dry cleaning," it is likely that the intent of the consumer is a local intent, such that the results should be directed to a specific geographic location. Local intent may refer to whether the consumer would like geographically specific (local) results or whether there is a geographic component to the search query. Accordingly, the search engine may determine the presence of local intent of certain keywords and attempt to provide search results that are targeted to a specific geography. Local intent may refer to any aspect of intent that the consumer would like to see in the results. The search engine determines and analyzes that intent to produce search results that satisfy the intent of the consumer. The local intent may be geo-related, rather than geo-specific, such that search results for goods or services from a national online retailer may be targeted to minimize shipping costs or other expenses.

The consumer who searches for a local dry cleaner should be shown content, advertising and listings that are geographically relevant because it is likely the consumer is only concerned with dry cleaners located at a certain geographic location. In addition, the relevant advertisements may relate to which local dry cleaners have specials, which don't use harmful chemicals, which are open late, and which are rated best by their community. General online information or websites about "dry cleaning" may not be relevant to a consumer concerned only with local dry cleaners. Directory information, social media, maps, and advertising may all contribute to help the consumer make the best decision. Accordingly, geographic relevancy plays a greater role (in combination with contextual relevancy) in driving overall relevancy.

Some consumers may explicitly geo-modify their searches to specify a location. For example, a consumer may search for "Chicago dry cleaning," which shows local intent for dry cleaners in Chicago. However, there may be hundreds of dry cleaners in Chicago, and the geographic location may need to be narrower than Chicago to achieve useful results. In addition, smaller, lesser-known towns or cities that are included in a search may result in search results that are not relevant to the specific location that is referenced. Further, many users fail to explicitly geo-modify searches, so the search engine must determine whether a consumer would like geo-specific results and how big a range of geography should be covered.

As the amount of local search traffic increases, there is a need for a search engine to respond with more geographically relevant results. Search behavior with local intent may gradually increase over time, as consumers receive more relevant local media and advertising in response to local keyword searches. Search traffic may contain more local intent, as users increasingly rely on the Internet as a primary source of information for their local purchasing decisions. Accordingly, a system that accurately determines when a consumer has local intent and determines the geographical scope of that intent in order to select the most relevant content and/or advertisements would be beneficial.

BRIEF DESCRIPTION OF THE DRAWINGS

The system and/or method may be better understood with reference to the following drawings and description. Non-limiting and non-exhaustive embodiments are described with reference to the following drawings. The components in the figures are not necessarily to scale, emphasis instead being placed upon illustrating the principles of the invention. In the figures, like referenced numerals designate corresponding parts throughout the different views.

DETAILED DESCRIPTION

By way of introduction, the embodiments described below include a system and method for determining local intent, determining a geographic range of the local intent, and providing relevant advertisements based on that local intent and its geographic range. In particular, a search engine may receive keywords or queries from users and the keywords are used to determine local intent and select targeted content and/or advertisements based on the local intent and its geographic range. Local intent may refer to the intent that a consumer may have when performing a search, such as if the consumer desires geographic specific search results. The embodiments relate to determining whether local intent exists, determining the geographic range of this local intent, and selecting geographically and contextually relevant targeted content to be displayed.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims and be defined by the following claims. Nothing in this section should be taken as a limitation on those claims. Further aspects and advantages are discussed below in conjunction with the embodiments.

Figure 1:
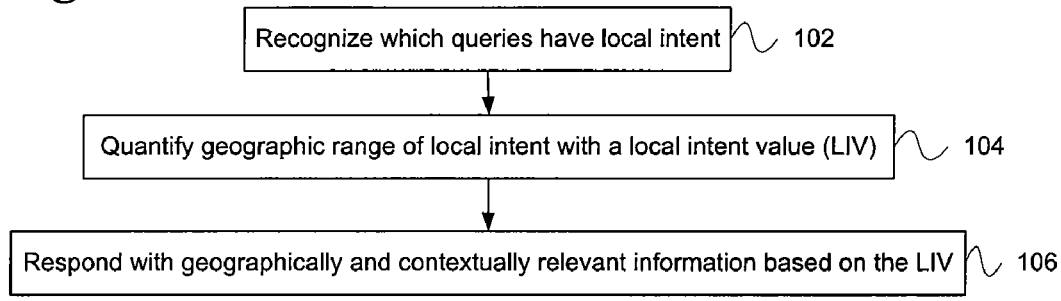
FIG. 1 provides a simplified view of one embodiment of an operating environment.
Figure 2:
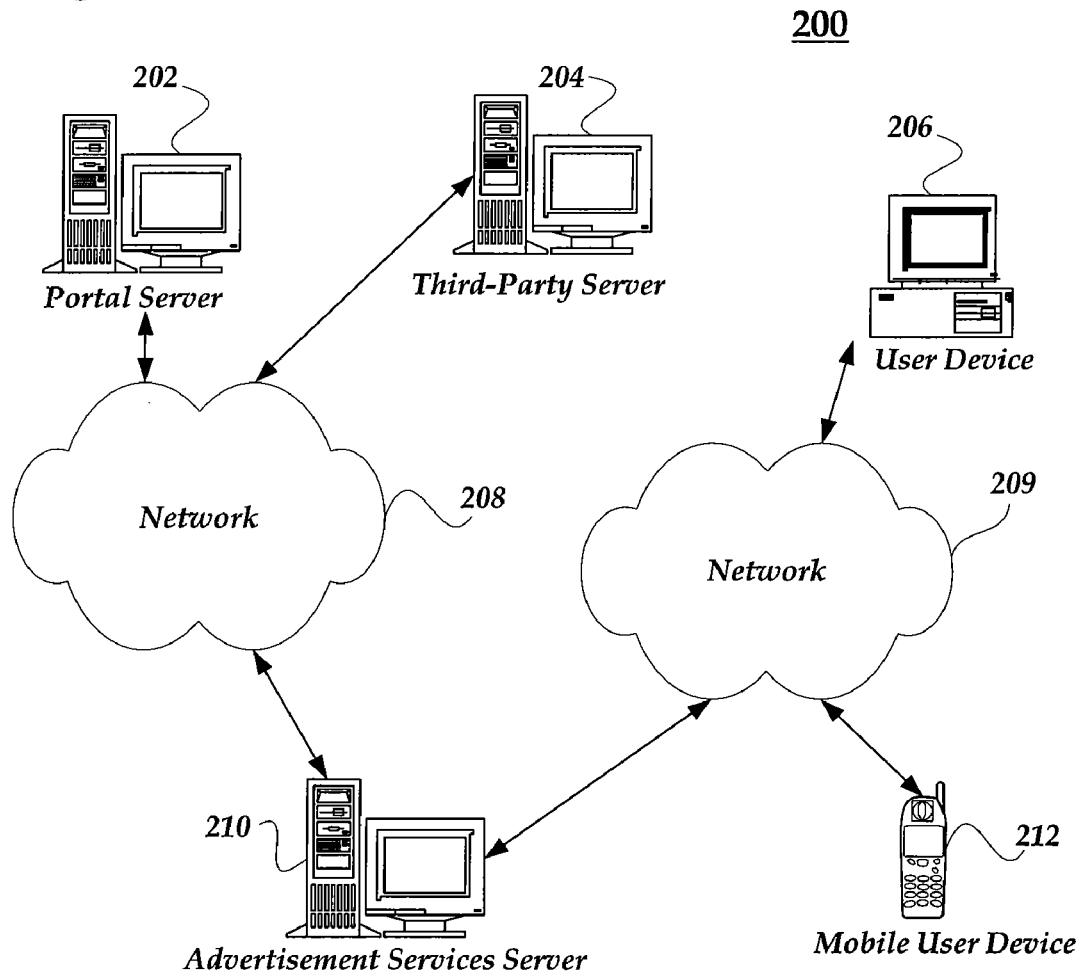
FIG. 2 is a block diagram of an exemplary user system.
Figure 3:
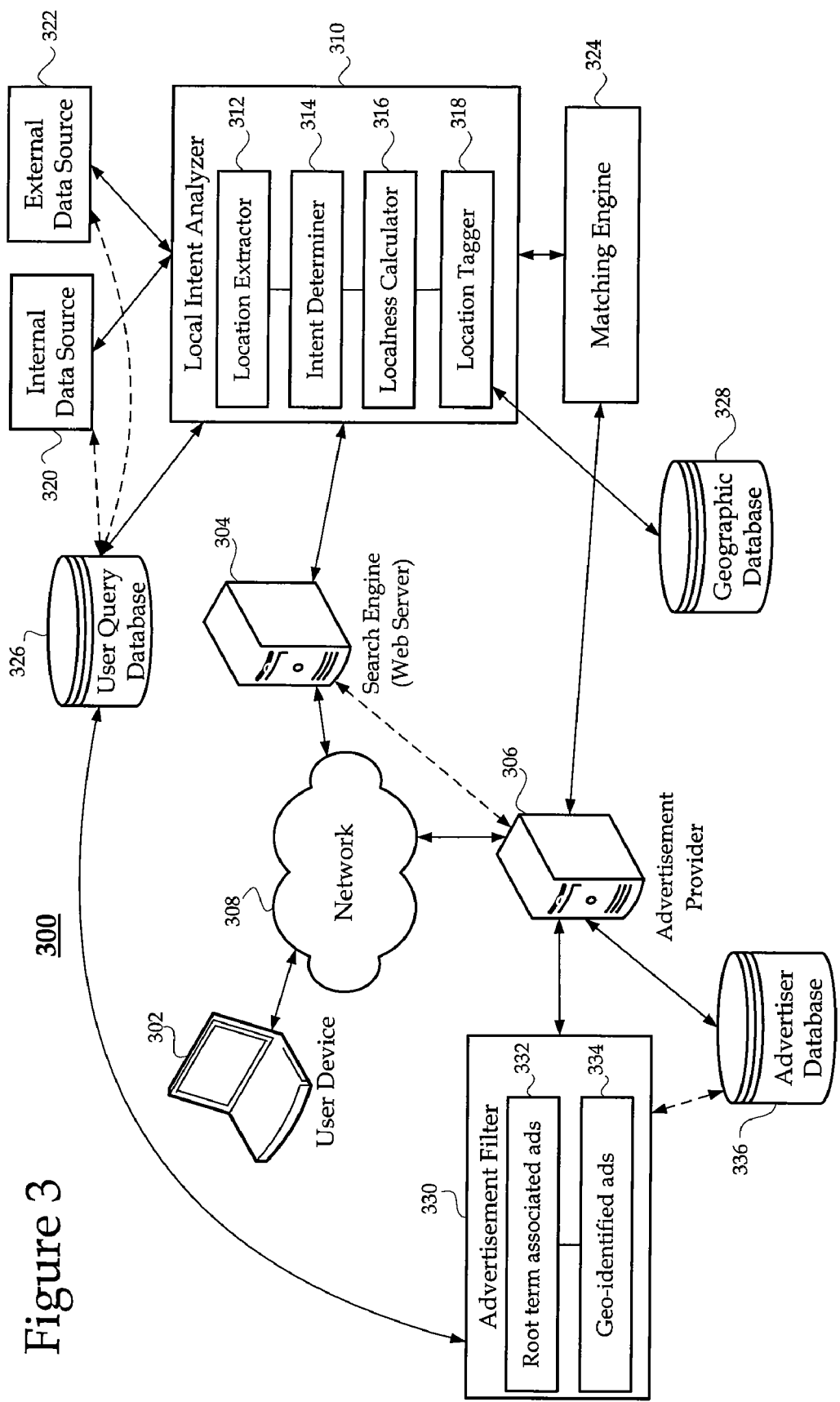
FIG. 3 is a block diagram of an exemplary network system.

FIG. 1 is a flowchart depicting an embodiment of using local intent in searching. In particular, FIG. 1 illustrates one embodiment utilizing a system for incorporating local intent into a display of search results and/or advertisements in response to a user query. Embodiments of such a system are illustrated in FIG. 2 and FIG. 3. A user may submit a search query to a search engine and receive a list of search results, such as via a web page based display, menu, pop-up window, etc. The search engine attempts to display the most relevant pages and information based on the query entered by the user. Targeted content or advertisements may include any features or information displayed on the search results page in addition to the search results. The user query may include one or more search terms or keywords related to a topic for which the user is requesting pages or information.

In block 102, after a user submits a query to a search engine, the system recognizes which queries have local intent. Local intent refers to when a user submits a search query for which the user would like results that are local or geographically specific. For example, a search for "restaurants" likely has local intent in that the user would like search results that are for a certain location. In block 104, the system may determine the geographic range of the local intent. For example, the range may be the size of a geographic radius of the local restaurants that are displayed. The range may vary from country, state, city, neighborhood or any other measured distance. As described below, the geographic range may be reflected in a local intent value (LIV). In block 106, the search query generates search results that are geographically and contextually relevant based on the local intent and the determined geographic range. As described in more detail below, a system may be operative to recognize local intent, calculate the geographic range of local intent and respond with geographically and contextually relevant information.

FIG. 2 provides a simplified view of one embodiment of a network environment 200. Network environment 200 may be for selecting and providing online advertisements. Not all of the depicted components may be required, however, and some embodiments of the invention may include additional components not shown in the figure. Variations in the arrangement and type of the components may be made without departing from the spirit or scope of the claims as set forth herein. Additional, different or fewer components may be provided.

The network environment 200 includes an advertisement services server 210, which may provide a platform for selection, optimization, and/or distribution of advertisements for inclusion in pages. Pages may be provided to users by a portal server 204 and/or a third-party server 202. In FIG. 2, users (also referred to as consumers) may be represented by the device by which they access the services of network environment 200, such as with a user device 206, depicted as a conventional personal computer, and/or other device such as a mobile user device, including a network-enabled mobile phone, personal digital assistant (PDA), pager, network-enabled television, digital video recorder, such as TIVO®, and/or automobile. The user device 206 may be the user device as described below with respect to FIG. 14.

Some or all of advertisement services server 210, portal server 204, and/or third-party server 202 may be in communication with each other by way of network 208 and may include the system or components described below with respect to FIG. 14. The advertisement services server 210 and portal server 204 may each represent multiple linked computing devices, and multiple third-party servers, such as third-party server 202, may be included in the network environment 200. The network 208 may be regarded as a public or private network connection, such as a virtual private network or an encryption or other security mechanism employed over the public Internet, or the like.

The user device 206 may be represented by user-interactive devices that typically run browser applications, and the like, to display requested pages received over a network. The user may be a consumer of goods of services that is searching for a business such as a business that is associated with advertiser. The device may communicate with the portal server 204 and/or the third-party server 202 by way of the network 209. The network 209 may include the Internet or be the same as the network 208. The networks 208 and/or 209 may be the network discussed below with respect to FIG. 14.

The portal server 204, the third-party server 202, the advertisement services server 210, and the user device 206 represent computing devices of various kinds. Such computing devices may generally include any device that is configured to perform computation and that is capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, user device 206 may be configured to execute a browser application that employs HTTP to request information, such as a web page, from a web server, which may be a process executing on portal server 204 or third-party server 202.

The networks 208, 209 may be configured to couple one computing device with another computing device to enable communication of data between the devices. Herein, the phrase "coupled with" is defined to mean directly connected to or indirectly connected through one or more intermediate components. Such intermediate components may include both hardware and software based components. The networks 208, 209 may generally be enabled to employ any form of machine-readable media for communicating information from one device to another. Each of the networks 208, 209 may include one or more of a wireless network, a wired network, a local area network (LAN), a wide area network (WAN), a direct connection such as through a Universal Serial Bus (USB) port, and the like, and may include the set of interconnected networks that make up the Internet. The networks 208, 209 may include any communication method by which information may travel between computing devices.

The advertisement services server 210 may be used for providing advertisements that are displayed to the user device 206. In particular, the portal server 202, or the third-party server 204 may be a search engine that receives a search query from the user device 206 and responds with search results. The portal server 202, or the third-party server 204 combined with the advertisement services server 210 may be utilized to determine local intent, determine the geographic range of local intent, and/or select the most relevant targeted advertisements based on the local intent described with respect to FIG. 1 and further discussed below with respect to FIGS. 4-13. In one embodiment, the portal server 202 may receive a search request and determine local intent, the third-party server 204 may determine the range of the local intent and the advertisement services server 210 may select geographically relevant advertisements to be displayed to the user device 206.

FIG. 3 is a block diagram of an exemplary network system 300. System 300 may represent a more detailed and/or alternate embodiment of network environment 200 as shown in FIG. 2. System 300 includes a user device 302, an advertisement provider 306, and a search engine 304 coupled with a network 308. The advertisement provider 306 is coupled with an advertisement filter 330 and an advertiser database. The search engine 304 is coupled with a local intent analyzer 310 that receives data from an internal data source 320 and an external data source 322. The search engine 304 further receives data from a user query database 326 and a geographic database 328. The local intent analyzer 310 and the advertisement provider 306 are coupled with a matching engine 324. Variations in the arrangement and type of the components may be made without departing from the spirit or scope of the claims as set forth herein. Additional, different or fewer components may be provided.

The user device 302 may be any device that a user utilizes to connect with the network 308. In one embodiment, the network 308 is the Internet and the user device 302 connects with a website provided by a web server, such as search engine 304, coupled with the network 308. In alternate embodiments, there may be multiple user devices 302 representing the users that are connected with the network 308. A user may not only include any individual, but a business entity or group of people. Any user may utilize a user device 302, which may include a conventional personal computer, computing device, or a mobile user device, including a network-enabled mobile phone, VoIP phone, cellular phone, personal digital assistant (PDA), pager, network-enabled television, digital video recorder, such as TIVO®, and/or automobile. A user device 302 configured to connect with the network 308, may be the general computer system or any of the components as described with respect to FIG. 14. In one embodiment, the user device 302 may be configured to be coupled with the search engine 304 through the network 308 with a web browser, such as INTERNET EXPLORER® or NETSCAPE NAVIGATOR®. The web browser provides an interface through which the user may perform a search. In alternate embodiments, there may be additional user devices 302, and additional intermediary networks (not shown) that are established to connect the users or user devices.

The network 308 may generally be enabled to employ any form of machine-comprehensible media for communicating information from one device to another and may include any communication method by which information may travel between devices. The network may be a network 1426 as described with respect to FIG. 14. For example, the network 308 may include one or more of a wireless network, a wired network, a local area network (LAN), a wide area network (WAN), a direct connection such as through a Universal Serial Bus (USB) port, and the like, and may include the set of interconnected networks that make up the Internet. The wireless network may be a cellular telephone network, a network operating according to a standardized protocol such as IEEE 802.11, 802.16, 802.20, published by the Institute of Electrical and Electronics Engineers, Inc., or WiMax network. Further, the network 308 may be a public network, such as the Internet, a private network, such as an intranet, or combinations thereof, and may utilize a variety of networking protocols now available or later developed including, but not limited to TCP/IP based networking protocols. Any of the components in network 200 and/or system 300 may be coupled with one another through other networks in addition to network 308.

The search engine 304 may be a content provider or a web server operated over the network 308 that provides pages to users, such as to the user device 302. The search engine 304 may comprise a general computer system or any of the components as described below with respect to FIG. 14. In one embodiment, the search engine 304 is a webserver that provides a website that may be accessed by users and includes the ability to conduct a search over a network, such as the Internet. Yahoo! ® is one example of a search engine embedded in a website (www.yahoo.com). The search engine 304 may receive a search query from a user and provide search results to that user. The search engine 304 may also provide other content and/or advertisements in addition to the search results.

The local intent analyzer 310 may determine and/or analyze local intent in search queries submitted to the search engine 304. The local intent analyzer 310 may comprise a general computer system or any of the components as described below with respect to FIG. 14. The local intent analyzer 310 may be coupled with the search engine 304 or may be a part of the search engine 304. The local intent analyzer 310 is configured to determine if a search query includes local intent and analyze the extent of that local intent, which may be used to generate the provided content, including search results and advertisements.

The local intent analyzer 310 may receive data from the internal data source 320 and/or the external data source 322. In one embodiment, the data sources 320, 322 may be one or more databases that are used to store and/or provide information that may assist in the determination and analysis of local intent within the local intent analyzer 310. The internal data source 320 may include search terms and traffic that are associated with the search engine 304. The search engine's 304 historical search data may be used to provide insight regarding local intent for searches by identifying which queries required location-specific information. The external data source 322 may include any data from sources other than the search engine 304. For example, classification trees and topic taxonomies from pre-existing businesses that express the intrinsic local nature of search terms such as the category headings of yellow page or direct mail companies, (e.g. "dry cleaning" may be a popular, well-monetized advertiser heading).

The external data source 322 may include other sources, which use the United State's standard industrial classification code, (formerly known as SIC code and now the NAIC). The industrial classification index may contain topics and/or sub-topics made up of inherently local search terms, such as "Autos>AutoRepair>Bodyshops." Accordingly, local intent may be determined based on these identified topics, which may be present in a search query. The percentage of time that a local term like "dry cleaner" has commercial local intent may be determined from data sources of user behavior or commercial use of the term "dry cleaners." Historical data of how the term "dry cleaners" is searched or how commercial use of the term generates money in other businesses can form the basis of the probability with which dry cleaners has local intent. The solution provides for the ability to use multiple data sources in determining the probability of local intent for high volumes of user terms as described below.

The local intent analyzer may include a location extractor 312 which may receive a search query from the search engine 304 and determine if the search query includes a root term and/or a location term. The root term may be the content or subject of the search, while the location term identifies a location for that content or subject. A search query may include a root term only that is the subject of the search, or it may also include a location term that identifies a relevant location for the displayed results that are related to the root term. For example, a search query for "Chicago restaurants" has a location term "Chicago" and a root term "restaurants." The location extractor 312 may analyze and determine if the query includes a location term, which may be separated from the root term. The root term may include the remainder of the query minus the location term. The analysis may be done for current search queries from the search engine 304 or may be from historical data from the internal or external data sources 320, 322. The extraction of a root term and a location term from a search query may be used in determining and analyzing local intent for the search query.

The location extractor 312 may be coupled with the user query database 326. The user query database 326 may include storage of root terms along with a measure of an associated local intent or possible location terms that are associated with those root terms. The stored root terms may include historical data related to search queries that include that root term. For example, if a root term is frequently coupled with a location term, then that root term is likely to have local intent. Accordingly, the user query database 326 receives data regarding the search queries for particular root terms. That data may used in determining local intent, which also may be stored in the user query database 326. In one embodiment, the user query database 326 includes a list of root terms from historical search queries along with all the location terms that have been searched with each of the root terms. For example, the root term "restaurants" may have been searched with the location terms "Chicago," or "New York City." Both of the location terms may be recorded in the user query database 326 as well as a frequency with which the location term has appeared with each root term in the historical search data.

The local intent analyzer may include an intent determiner 314 which may determine if a search query includes local intent. In one embodiment, the data from the user query database 326 may be used to determine a probability of local intent for particular root terms. Accordingly, a search query including certain root terms may be determined to have local intent. For example, a root term that is frequently associated with a location term may be an indicator that a search query with that root term has local intent.

The local intent analyzer may include a localness calculator 316, which may determine the geographic scope of the local intent for a search query. The localness calculator 316 may analyze the search query and calculate the geographic scope of local intent as described below with respect to FIG. 10. For example, the local intent of a search query for "dry cleaning" has a smaller geographic range than a search for "used car dealers." The reason for the different geographic scope is that consumers may be willing to travel greater distances for a used car dealer than for a dry cleaner. Accordingly, a search for dry cleaner should have results, content and advertisements within a smaller geographic range. In one embodiment, the location term of a search query may explicitly identify a geographic range of the search. For example, a search for "dry cleaner in 1 mile" identifies that the geographic range is established to be 1 mile. Accordingly, the localness calculator 316 may identify an explicit geographic range in a search query.

The local intent analyzer may include a location tagger 318, which may be used to identify and label the locality of a search query. The location tagger 318 may perform location tagging of a search query. The location tagger 318 may be coupled with a geographic database 328 that includes geographic identifiers for locations. The geographic database 328 may also be referred to as a geo-planet database. The geographic identifiers may also be referred to as location identifiers. In one embodiment, the geographic identifiers may include numbers, referred to as location or geographic identifiers, that identify its location as described below with respect to FIG. 13. The geographic identifiers stored in the geographic database 328 may be used for the location tagger 318 and provide a unique identifier for each geography, including states, cities, counties, zip codes, neighborhoods and other points of interest. In particular, each search query or root term may be tagged with a geographic identifier by the location tagger 318.

A matching engine 324 may receive the analyzed search query from the local intent analyzer 310 and select an appropriate advertisement to be displayed with the search results. The matching engine 324 is coupled with the advertisement provider 306. The advertisement provider 306 receives a search query from the search engine 304 and/or receives information on the search query from the matching engine 324, which is used for the selection of relevant advertisements to be displayed on the user device 302. The matching engine 324 may be a part of the advertisement provider 306 and/or the search engine 304 for selecting an advertisement based on a search query.

The advertisement provider 306 may be a server that provides advertisements to the search engine 304 and/or the user device 302 directly. The advertisement provider 306 may comprise a general computer system or any of the components as described below with respect to FIG. 14. In one embodiment, the advertisement provider 306 may be associated with the search engine 304, such that the search engine 304 may include the advertisement provider 306. In an alternate embodiment, the advertisement provider 306 may be a content provider that also provides targeted content to be displayed with search results.

The advertiser database 336 may be coupled with the advertisement provider 306. The advertiser database 336 may include available advertisements that are available to the advertiser provider 306. The advertiser database 336 may also include available advertisers as well as information on size, content, pricing, and location specificity of the advertisements. In one embodiment, the advertiser database 336 may include at least one location identifier for each advertisement, that identifies a geographic association of the advertisement. For example, advertisements may be specific to states, regions, cities, or neighborhoods, such as advertisements for a sports team in the city and/or state that the team is located. Accordingly, an appropriate advertisement may be matched with a search query based on the location tagger 318. The location identifier(s) associated with each advertisement may be used for geographically matching the advertisements. In addition, each advertisement may also be associated with a geographic range that establishes the geographic areas in which the advertisement is targeted towards.

The advertisement provider 306 may be coupled with or may include an advertisement filter 330. The advertisement filter 330 may categorize or tag the available advertisements based on content and/or location. For example, the advertisement filter 330 may include root term associated advertisements 332 which categorize advertisements based on the root term of search queries. Root term associated advertisements 332 may be identified and categorized based in part from the user query database 326. Also, geo-identified advertisements 334 may categorize the advertisements based on the location of the advertisement. Geo-identified advertisements 334 may be tagged according to the same geographic identifiers as in the location tagger 318 with the geographic database 328. Accordingly, the advertisement filter 330 may categorize and filter available advertisements for appropriate matching of the advertisements with a search query by the advertisement provider 306 and/or the matching engine.

Figure 4:
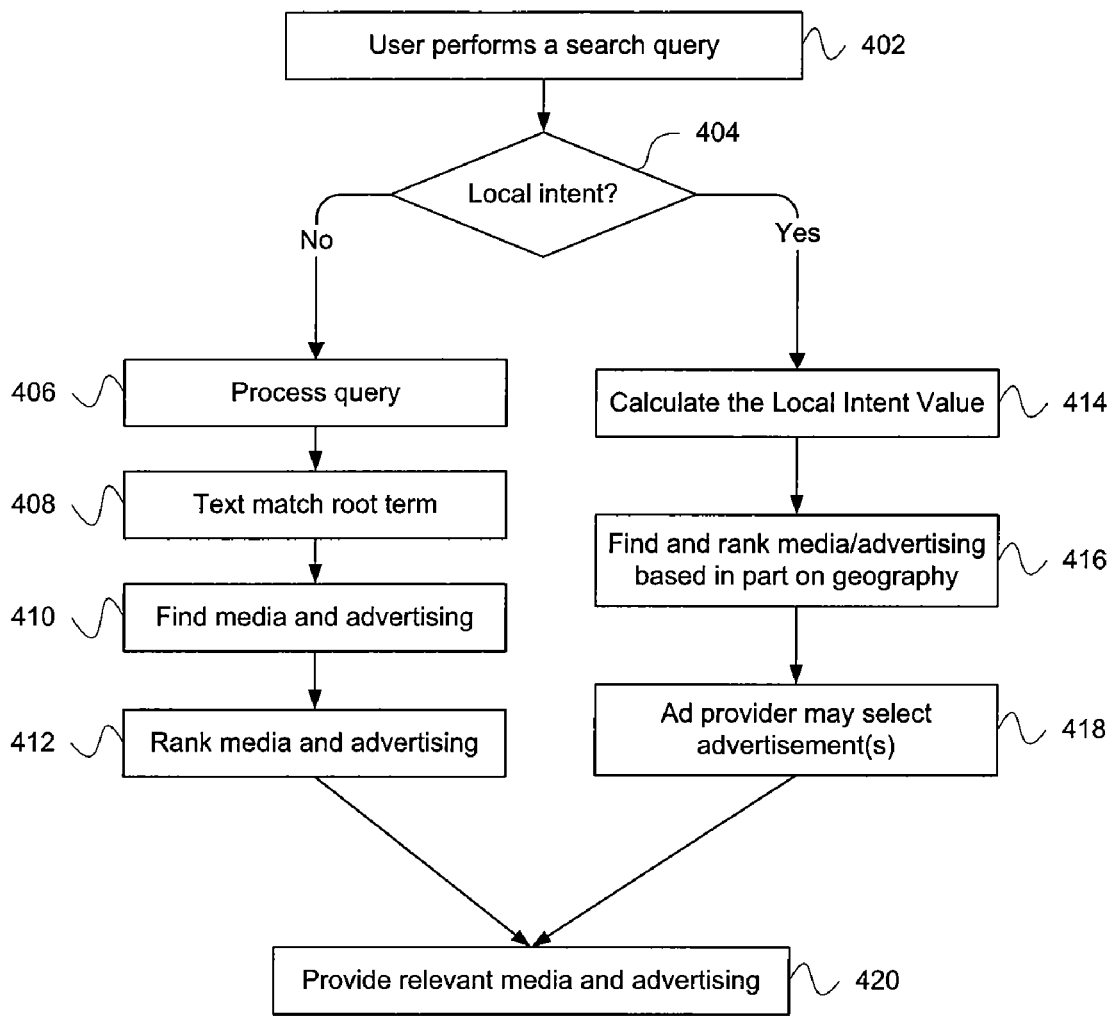
FIG. 4 is a flow chart illustrating one embodiment for searching.

FIG. 4 is a flowchart illustrating one embodiment for searching. In particular, FIG. 4 illustrates the providing or display of relevant media and advertising in response to a search query that may be based at least in part on local intent. In one embodiment, system 300, shown in FIG. 3, may perform the process illustrated by the blocks shown in FIG. 4. In block 402, the user performs a search query. Accordingly, user device 302 may include a browser through which a user submits a search query over the network 308 to the search engine 304. The search engine 304 may return search results to the user device 302 based on the search query in addition to targeted content and/or advertisements. The search engine 304 may provide a way to find online information. One example of a search engine 304 is Yahoo! available or accessible at www.yahoo.com. The search query may also be referred to as a keyword(s), term(s), and/or search term(s). The search engine 304 provides search results that are relevant based on the query.

Upon receiving the search query, the search engine 304 determines if the search query includes local intent (block 404). In block 404, if there is no local intent, then in block 406, the search query is processed. In one embodiment, the search query is received by the search engine 304 and analyzed. The analysis may include extraction of a root term from the search query. In block 408, the search engine 304 may look for a text match to with the root term. Based on the text matches, in block 410, relevant media and advertising is found. Because no local intent was found in block 404, the search results as well as the advertisements are based on the text of the search query and contextual matches with the query. In block 412, the matched media and advertising may be ranked based on relevance. The ranking may be based on the matching of the search query. Based on the rankings from block 412, the most relevant media and advertising may be provided in block 420. Accordingly, the search engine 304 provides the user device 302 with relevant search results and advertisements based on the provided search query.

Referring back to block 404, the determination of local intent may include either an explicit local intent or an implicit local intent. An explicit local intent would be a location that is included in the search as one of the keywords, such as "Chicago dry cleaning." In particular, explicit local intent found in a search query that includes a location term in addition to a root term. The location term in the search query shows explicit local intent. Implicit local intent may be certain keywords that are known to frequently be associated with a particular geographic location. For example, in a search for "dry cleaning" it is implicit that the consumer would like geographic specific results.

Explicit local intent may be analyzed based on recognition of the explicit location term. When an explicit location is recognized, the query is parsed into its location term and root term, and the root term is said to have local intent. If the search is "Pasadena dentist," then the local intent is determined to be the geographic location of Pasadena and the root term that is contextually matched is dentist. In alternate embodiments, the location term may be an area, neighborhood, landmark, store or zip code. Colloquial areas, national parks, schools, hospitals, museums, sports stadiums, airports, public transportation locations, subway stops, and other types of popular landmarks may be other locations that consumers may identify.

Explicit location recognition parses location terms that may not be used as a location. For example, a search for "Jack London" or "Paris Hilton" include a common location term, but in fact that location term is actually part of a name instead. Accordingly, the system may recognize such false positives. Further, ambiguous locations may also introduce errors in recognizing local intent from explicit location names. For example, there exists a city named "Auto" in West Virginia, a city "Mobile" in Alabama, a city "Car" in France, and a city "George" in Washington State. Accordingly, the system may recognize ambiguous location names as well as false positives in which there is no local intent despite the presence of an explicit location term.

An implicit local intent may be found despite the absence of an explicit location term in the query. In one embodiment, the search engine 304 may include or be coupled with a term database. The term database may be the user query database 326, or may be an alternate database that stores root terms, or keywords, as well as an indication to whether those root terms are likely to include local intent. For example, searches for root terms "restaurants" and "hotels" are likely to include local intent and may be so labeled. Accordingly, a root term database may be utilized to help determine whether a local intent is present.

Figure 5:
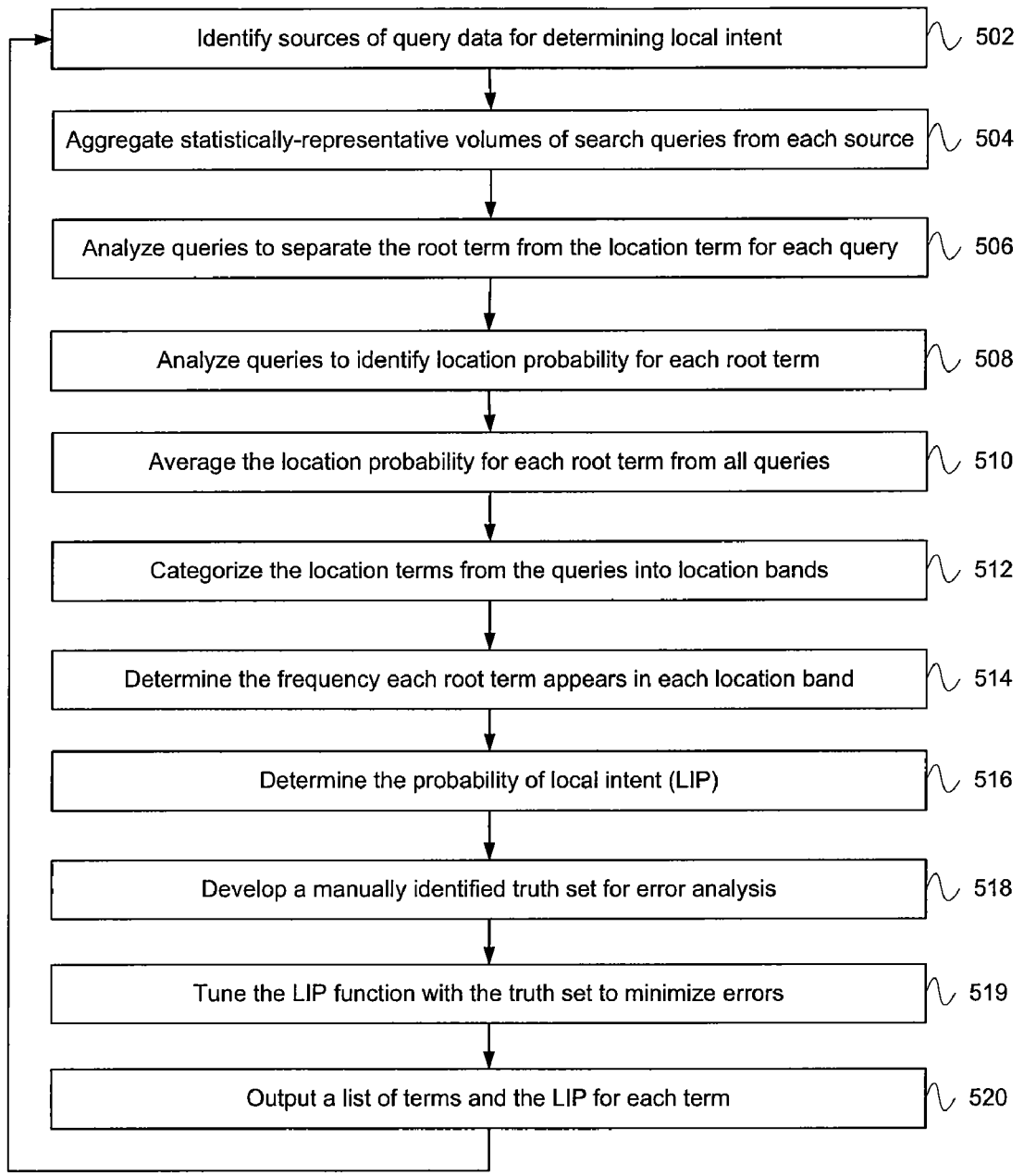
FIG. 5 is a flow chart illustrating one embodiment for determining local intent.

Both implicit local intent and explicit local intent may be identified and analyzed further as described below with respect to FIG. 5. In particular, FIG. 5 is a flow chart illustrating one embodiment for determining local intent. FIG. 5 illustrates an embodiment for determining local intent regardless of whether the local intent is implicit or explicit. As illustrated, a probabilistic approach for determining local intent from multiple sources of data may not require a distinction between explicit and implicit local intent. The root term for each search query may be associated with a local intent probability that represents the probability that the root term includes local intent.

In one embodiment, there may be different probabilities calculated for different sources of search query data. In block 502, sources of query data are identified. As described above in system 300 for FIG. 3, internal data sources 320 and/or external data sources 322 may be utilized for search query data. In one embodiment, the various data sources used to provide search query data may be weighted in developing a probability of local intent based on the data sources. The data sources may be used in a probabilistic model to compute a local intent probability based on the frequencies with which explicitly local search queries include locations. However, in order to control the strength of each contribution from multiple data sources, tunable parameters may be incorporated into the probabilistic model. The tunable parameters may provide the ability to weight the contribution from each data source and to control how both query traffic with locations and traffic without locations can affect the local intent probability.

The presence of an explicit location is frequently indicative of local intent. Accordingly, the sources of search query data, such as internal data sources 320 and/or external data sources 322, may be used to determine which search queries and root terms were associated with an explicit location. A root term that is frequently searched with a location term has a high probability of local intent, while a search query that rarely includes a location term may have a low probability of local intent. Accordingly, the search query data may be used to develop the probability that a search query has local intent.

In block 504, large volumes of query data containing users' search behaviors may be captured and assembled for the purpose of determining local intent. This user query data may be captured by sampling large volumes of statistically-representative user search queries from multiple user query data sources. Query data sources may include different types of searches, such as a general search over the web, a geographically specific search, a shopping related search, or any other specialized search. For example, some search engines may have a mainline search as well as local search queries and/or queries conducted within local online categories such as auto, shopping and real estate. Various query data sources may then be assembled using weighting functions to weight the contribution that each query source has in determining the local intent of a search terms. The weights may be relative and may indicate which query source best represents the local intent of a user. Each of the search query data sources are analyzed to extract a representative set of search queries that may be used in determining local intent.

In block 506, the root term is separated from the location term for each search query from the data sources. As described in block 504, a set of search queries may be extracted from each of the data sources and it is those queries that are analyzed in block 506 by first determining the root term and location term. In particular, the location extractor 312 may remove the location term and leave the root term. In block 508, the set of queries are analyzed to identify location probability for each of the root terms removed in block 506. The analysis in block 508 may occur simultaneously with the removal from block 506.

In one embodiment, a probability of local intent is determined for a removed root term. That root term may also be associated with a location identifier as described below. In block 510, the location probability for each root term is averaged across multiple data sources for each available query. The available queries may include a set of search queries as extracted in block 504.

Figure 6:
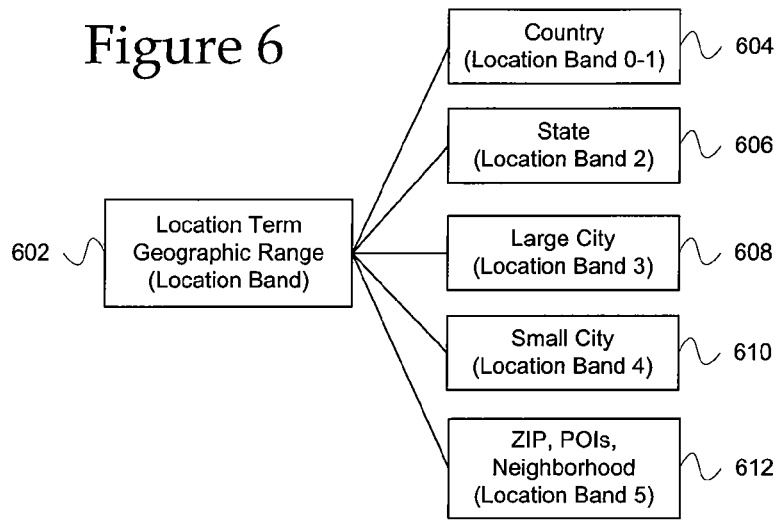
FIG. 6 is a block diagram illustrating location terms.

In block 512, the search query data is analyzed and the queries are categorized into location bands, which may be referred to as a location type. FIG. 6 is a block diagram illustrating location terms. In particular, the location term geographic range 602 may be broken down into five bands. In alternate embodiments, there may be more or fewer bands that may or may not overlap. As shown in FIG. 6, the first and broadest location band 604 is country. The country refers to the geographic range of a country, such as the United States. The second location band 606 is a state. State refers to any of the States in the United States. The state band 606 is encompassed by the country band 604 and may be referred to as a child location to the country location band 604. The third band 608 is a large city. A large city may cover the geographic range of a large city such as Chicago or San Francisco. The large city band 608 is encompassed by the state band 606 and may be referred to as a child location of the state band 606. The fourth band 610 is a small city. The small city or county band 610 may be encompassed by the large city band 608 and may be referred to as a child location to the large city band 608. In an alternate embodiment, the third location band 608 or the fourth location band 610 may also include a county. A county may encompass a large city, or a county may encompass a large city, so the categorization of a county may vary.

The fifth location band 612 is a ZIP code, point of interest, or neighborhood. A neighborhood may be a subset of a city, such as Lincoln Park is may be considered a neighborhood in Chicago. Points of interest may include specific locations, such as landmarks, colloquial areas, parks, schools, hospitals, museums, sports stadiums, airports, public transportation locations, subway stops, and other types of popular landmarks. For example, a search query for "Wrigley Field bars" is based on the location band 612 for a specific point of interest. The user identifies a specific location, Wrigley Field, and would like to know the bars that are located around that location. It would not be relevant to provide bars throughout a city or county as in location band 610 because a point of interest is identified establishing a narrow geographic range.

As shown in FIG. 6, location bands may establish a geographic range. As illustrated each successive location band covers a small geographic range. The location bands covering a larger geographic range may be referred to as a parent location to any smaller location bands within the larger geographic range. In alternate embodiments, there may be more or fewer location bands and the location bands may or may not overlap with one another. The identification of a location band may allow for more accurate targeting. For example, certain search queries may only be relevant for a State, such as location band 606, while other queries are more narrow and relevant to a specific neighborhood, such as location band 612. For example, a search query for "dry cleaners" in the state location band 606 would not yield relevant results, because the geographic range is too large. Conversely, a search for "national parks" may be more relevant in the State location band 606 that is geographically broad enough to cover potential matches.

Referring back to FIG. 5, in block 512, the search queries are categorized into location bands, based on the location term geographic range 602. Specifically, the location terms that are extracted from each search query are categorized into a location band. The identified location bands may then be used in displaying search results and selecting advertisements.

In block 514, the search queries from the data sources are analyzed relative to the location bands from block 512 to determine the frequency each query appears in a particular location band in the historical search query data. For example, each root term of a search query may appear with a variety of location terms. The frequency that the root term is associated with each location band is determined based on the historical search queries and is stored in a database, such as the user query database 326. In other words, count-statistics are computed for each root term to tally how many times it appears within each location band based on historical search queries that matched the root term with location terms from each of the location bands. For example, the number of queries containing the term "handyman" occur with no location, with any state name, with any large city name, with any small city name or with any neighborhood, zip code, village, town or landmark name are tallied. It is likely that the frequency that the root term "handyman" is associated with more narrow location bands is higher than the frequency that it is associated with broad location bands. Accordingly, the frequency in the neighborhood location band is likely greater than the frequency in the country location band because it is unlikely a search query would want any handyman in the United States, but rather would identify a more specific location for finding a handyman. This frequency analysis determines which location band that the root term "handyman" may belong.

Figure 7:
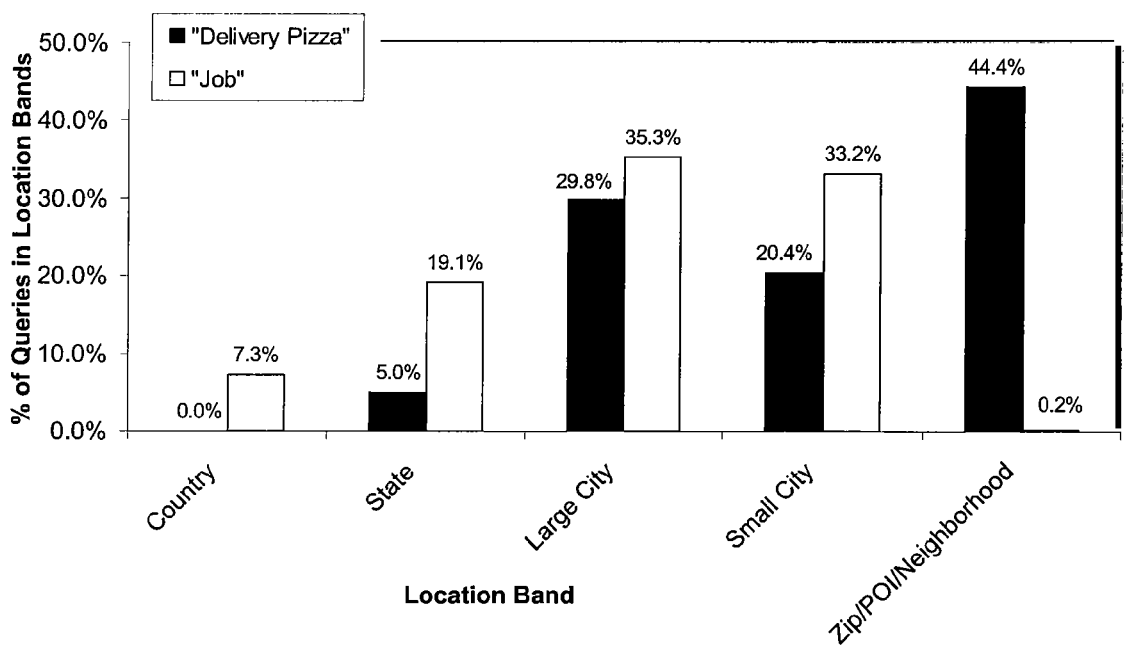
FIG. 7 is an illustration of a frequency distribution of a term.

FIG. 7 is an illustration of a frequency distribution of a root term. Specifically, the chart 700 in FIG. 7 illustrates the frequency with which a root term may be associated with different location bands or location types. Chart 700 is an illustration of the frequency of location bands for any root term by displaying the percent of explicit locations along the y-axis, which is the percent that a location term is present in a particular location type. The x-axis illustrates five location bands and the bar is the percentage of time each location term (associated with that location band) is found in a search query with the root term at issue. In alternate embodiments, there may be additional or alternative location types.

For example, if the root term is "delivery pizza" then 29.8% of the searches are for a large city, such as "Los Angeles delivery pizza." However, 44.4% of the searches are for a neighborhood or point of interest, such as "Lincoln Park delivery pizza." The explicit location terms are analyzed and categorized into one of the location bands for each root term. A search without a location term would suggest no local intent and would not be included in one of the location bands, or would be a location band identified as not being associated with a particular location. Based on the frequency distribution shown in chart 700, the root term of "delivery pizza" would be classified in the small cities location band or the neighborhood band.

Alternatively, for the root term "job," chart 700 illustrates that the localness is lower than for "delivery pizza." People are more likely to associate a job with a large city or even a small city. Rarely would a search for "job" focus on a neighborhood or a point of interest. Based on the frequency distribution shown in chart 700, the root term of "job" would be classified in the large cities location band, or location band 608 in FIG. 6.

Figure 9:
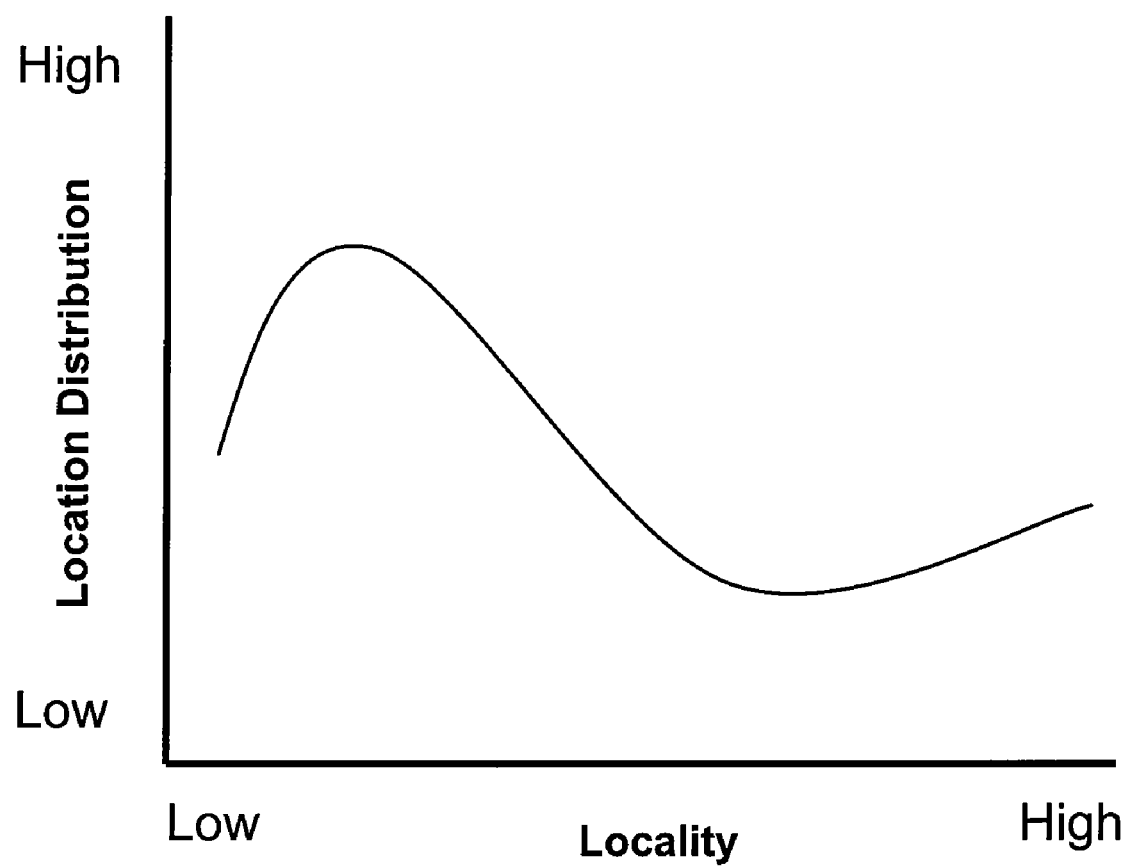
FIG. 9 is an illustration of the relationship between location distribution and locality according to one embodiment.

FIG. 9 is an illustration of the relationship between location distribution and locality according to one embodiment. Chart 900 may be one embodiment of a distribution of location distribution as a function of locality or LIV. Chart 900 may be an alternate illustration of the histogram 700 shown in FIG. 7. Chart 900 illustrates that the function may be continuous rather than discrete across the locality values. There may be a grouping of location types (such as the five groups in FIG. 7), or the location types may be continuous rather than discrete as in Chart 900.

Referring back to FIG. 5, in block 516, a probability of local intent or local intent probability (LIP) is calculated. The LIP may be calculated in different ways, such as a statistical function of location bands, as a function of the LIV, or as a function of the LRP. Other examples of LIP calculation may exist. The chosen calculation may be the one that produces the greatest commercial value. As new functions are discovered, that create more commercial value, they will be applied as well.

Figure 8:
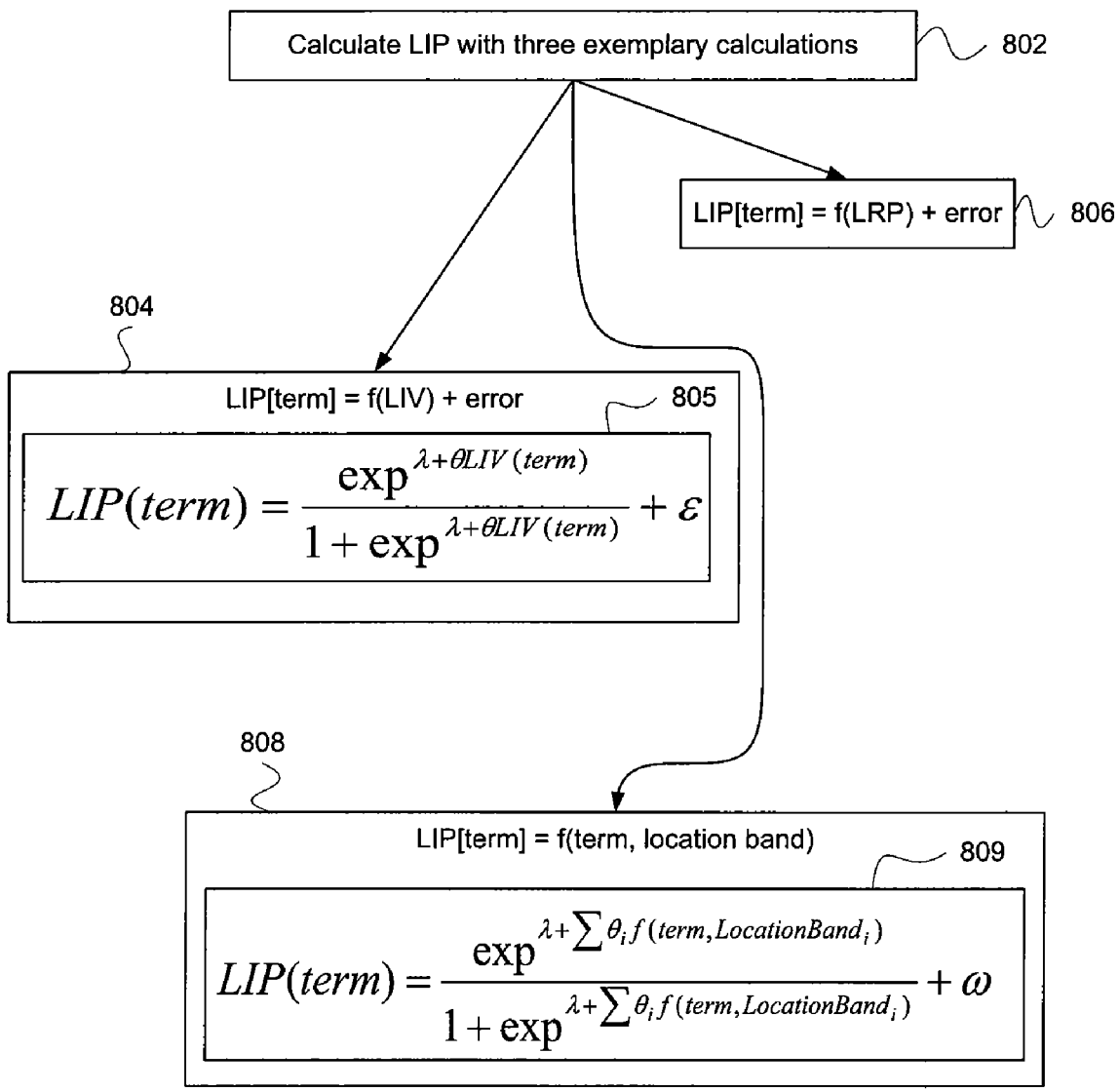
FIG. 8 is a flowchart illustrating one embodiment for determining local intent probability.

FIG. 8 illustrates three examples for the calculation of the LIP. A first LIP calculation (block 804) is a function of LIV. A second LIP calculation (block 806) is a function of LRP. A third LIP calculation (block 808) is a statistical function of location bands. These three exemplary LIP calculations will be discussed below. The LIP calculation may be modified to attempt to accurately determine which searches have local intent. As more data is available, the model used for calculating LIP may evolve and may be determined based on commercial value. As new functions are discovered that create more commercial value, they may be applied as well. The LIP may be based on the count and frequency distribution combined with an appropriate statistical model. The statistical formulas may evolve as more data sources become available. FIG. 8 is a flowchart illustrating one embodiment of determining local intent probability (LIP). Specifically, FIG. 8 illustrates examples of calculations of the LIP value.

In block 802, the LIP is calculated with a statistical probability model. In alternate embodiments, there are alternative models that may be used to calculate the LIP than the three that are illustrated. In one embodiment a local intent value (LIV) may be used in the statistical function. In a second embodiment, the LRP may be used as the statistical function. In a third embodiment, the location band distributions for each term may be used as the statistical function. The LIV may a representation of the geographic range of the local intent and is further described below in block 1012 of FIG. 10. The LIP may be a function of LIV(term) as in the formulas shown in FIG. 8.

In block 804, the LIP is a function of a local intent value (LIV) combined with an error term. In particular, LIP[term]= f(LIV)+error, where term is the root term from the search query for which the LIP is being calculated. Block 805 is one example of this LIP calculation and may be an LIP regression model. Specifically, the LIP may be calculated to be:

$$LIP(\text{term}) = \frac{\exp^{\lambda+\theta LIV(term)}}{1+\exp^{\lambda+\theta LIV(term)}} + \varepsilon,$$

where the LIV is calculated as described above. Error (c) model can be white noise process i.e. normal with mean=0, standard deviation=σ or any stationary process whose parameters can be calculated empirically. In a mathematical notation, $\epsilon=N(0,\sigma)$. LIP(term) is the probability of a term being local intent or not and λ (lambda) and θ (theta) are the parameters of the model. The value of λ yields LIP when LIV(term) is zero, and θ adjusts how quickly the probability changes with changing LIV(term) a single unit In block 806, an alternative statistical probability model is used for calculating the LIP based on a location related probability (LRP) combined with an error term. The LRP may be a quantification of probability that a search term is related to geography, or a specific location. In particular, in block 806, LIP[term]=f(LRP)+error.

An alternative statistical probability model for calculating the LIP is shown in block 808. In particular, LIP[term]=g(freq$_{location\ band\ 1}$, ..., freq$_{location\ band\ k}$, location query frequency, relative frequency of verticals, ...)+error. In an abbreviated expression, as shown in block 808, the LIP(term) may be f(term, location band)+error. The location query frequency may be calculated from the distribution histogram of location bands for each term. This direct LIP formula may be based on weighted data from the location bands.

Alternatively, the location query frequency may be calculated as the number of root term queries in a particular location band divided by the total number of root term queries. The relative frequency of a term for a query source data may be the percentage of that term occurring out of all or a subset of search for a specified time interval. In an alternative embodiment, there may be a different LIP regression model.

An LIP regression model is shown in block 809. Specifically, the LIP may be calculated to be:

$$LIP(\text{term}) = \frac{\exp^{\lambda+\Sigma\theta_i f(term, LocationBand_i)}}{1+\exp^{\lambda+\Sigma\theta_i f(term, LocationBand_i)}} + \omega,$$

where the location bands are any of the location types as discussed in FIG. 6. The variable i represents the number of location bands, which is five in the example shown in FIG. 6. Exp( ) is an exponential function and ω and ε each represent an error model. Error model (ε) may be normal probability distribution with mean=0 and standard deviation=a from empirical data, or in mathematical notation $\epsilon=N(0,\sigma)$ as one of the alternatives. In one embodiment, the LIV calculation may be based on frequencies for each location band. Therefore, the local intent probability model may be represented theoretically in terms of frequency i and other factors such as location query frequency. λ represents when function f(term, locationBand$_i$)=0 and θ_{i} represents how quickly the probability changes when f(term, location Band) a single unit. Because the relation between f( ) and LIP( ) may be nonlinear, θ_{i} may not have a straightforward interpretation in this model as it does in ordinary linear regression. Accordingly, this is an example of a class of statistical model (nonlinear) multivariate logistic regression. The function f in the formula may represent the frequency of the term in a particular location band.

Referring back to FIG. 5, after the LIP is calculated in block 516, a manually identified truth set is developed for error analysis in block 518. An editorial truth set may be established in which editors may manually identify the local intent of a large sample of terms. The editors manually determined local intent values may be used to for error correction, for tuning or parameters, or as a training set. Using one of the tunable probability models with error functions as discussed above may allow for the tuning of model parameters to replicate or exceed the precision and recall of the editorially-controlled truth set. The truth set may be used to minimize the error function. The truth set may be a set of root terms provided for determining to what extent computed LIP values based on the proposed system and method match with measured editorial local intent values. The truth set may provide a training set which is used to calibrate the parameters used in calculating the LIP values and further used to estimate a representative error model. In block 519, the LIP function is tuned with the truth set to minimize errors. In other words, truth sets are used to "tune" the functions for LIP and for LIV, to minimize error. Once the functions are tuned, they may be re-run to output another list of terms with their LIP and LIV parameters for each term.

In block 520, a list of the root terms and their corresponding LIP may be outputted. In one embodiment, the search engine 304 and/or the local intent analyzer produce the list of terms with their associated LIP value. In particular, the list of root terms and their local intent probability are stored in a table for use within applications that scan structure or unstructured text and queries to identify the local intent of the search terms or text terms scanned. In one embodiment, the list of root terms and LIP values may be stored in the user query database 326.

Accordingly, FIG. 5 illustrates one embodiment for determining the presence of local intent. The presence of local intent was determined in block 404 of FIG. 4 and in block 102 of FIG. 1. In particular, the determination of local intent is relevant because search queries that have local intent may receive search results in which geography is weighted more heavily as discussed below. In addition, local intent may be used for providing geographically targeted content and advertisements with the search results. Conversely, search queries that have less or no local intent will receive search results in which geography is less heavily weighted, or not weighted at all. Once local intent is established, the geographic range of the local intent may be determined as shown in block 104 of FIG. 1.

Referring back to FIG. 4, if local intent is determined to be present in block 404, then the local intent value (LIV) is calculated as in block 414. Conversely, as discussed above, if local intent is not found in block 404, then the search query is processed without considering geography. In one embodiment, if the LIP is determined to be above a certain threshold, such as 50% or 75% probability of local intent, then that may be a determination that local intent is present in block 404.

The local intent value (LIV) is calculated in block 414. In particular, the LIV is a representation of the geographic range of the local intent. The geographic range of local intent is used as a measure of a consumer's consideration of a commercial offer or media content. The geographic range for a user to consider offers or media content may vary based on the product or service being purchased, or the media being consumed.

In one example, a person buying a car may have a large range for their willingness to purchase the car they want, of 5-50 miles or more from their home or work location. This range of 5-50 miles may be consistent with the general size of a large city metro area or a county. Conversely, a person who needs to dry clean their clothes will have a much smaller range for a dry cleaner, such as a 1-5 mile radius from the user's work or home. This range of 1-5 miles may be consistent with the general size of a small city, town, neighborhood, or suburb. Accordingly, the geographic range of the purchase opportunity for the root term "dry cleaners" is much lower than that for the root term "new/used cars." In other words, the term "dry cleaner" has greater localness in terms of commercial value than the term "used cars." The establishment of this geographic range may then be used in providing search results, content and/or advertisements that are within the geographic range.

The geographic range of searched root terms may be correlated to the frequencies with which their root terms are searched with geographic modifiers for explicit local intent. The range varies across the root terms. For example, root terms such as "mover," "home builder," and "new car dealer" may be associated with states and the larger cities 60-70% of the time. Conversely, root terms such as "dry cleaner," "mall," "condo rental," "medical center," and "winery" may be associated with smaller cities, neighborhoods, and/or landmarks over 70% of the time indicating that these root terms have a smaller geographic range. Accordingly, a user query for "malls," "stores," or "dry cleaners," may result in geo-targeting of advertising offers and media content that is very local with a small geographic radius. However when a user searches for "new auto dealer," "mover," or "home builder," geo-targeting may respond with city, metro, or large geographic radius advertising offers and media content.

The local intent value (LIV) as calculated in block 414 is a quantification that identifies the range of local intent for high volumes of root terms. The LIV may offer a measure of localness for each root term in a search query. The LIV quantifies queries with low localness, (such as "new homebuilder, mover, lottery, tickets"), as well as those with high localness, (such as "dry cleaner, mall, outlet, medical center and winery"). Accordingly, the LIV represents the geographic range of a root term, with a higher LIV representing a narrower geographic range and a lower LIV representing a larger geographic range.

Figure 10:
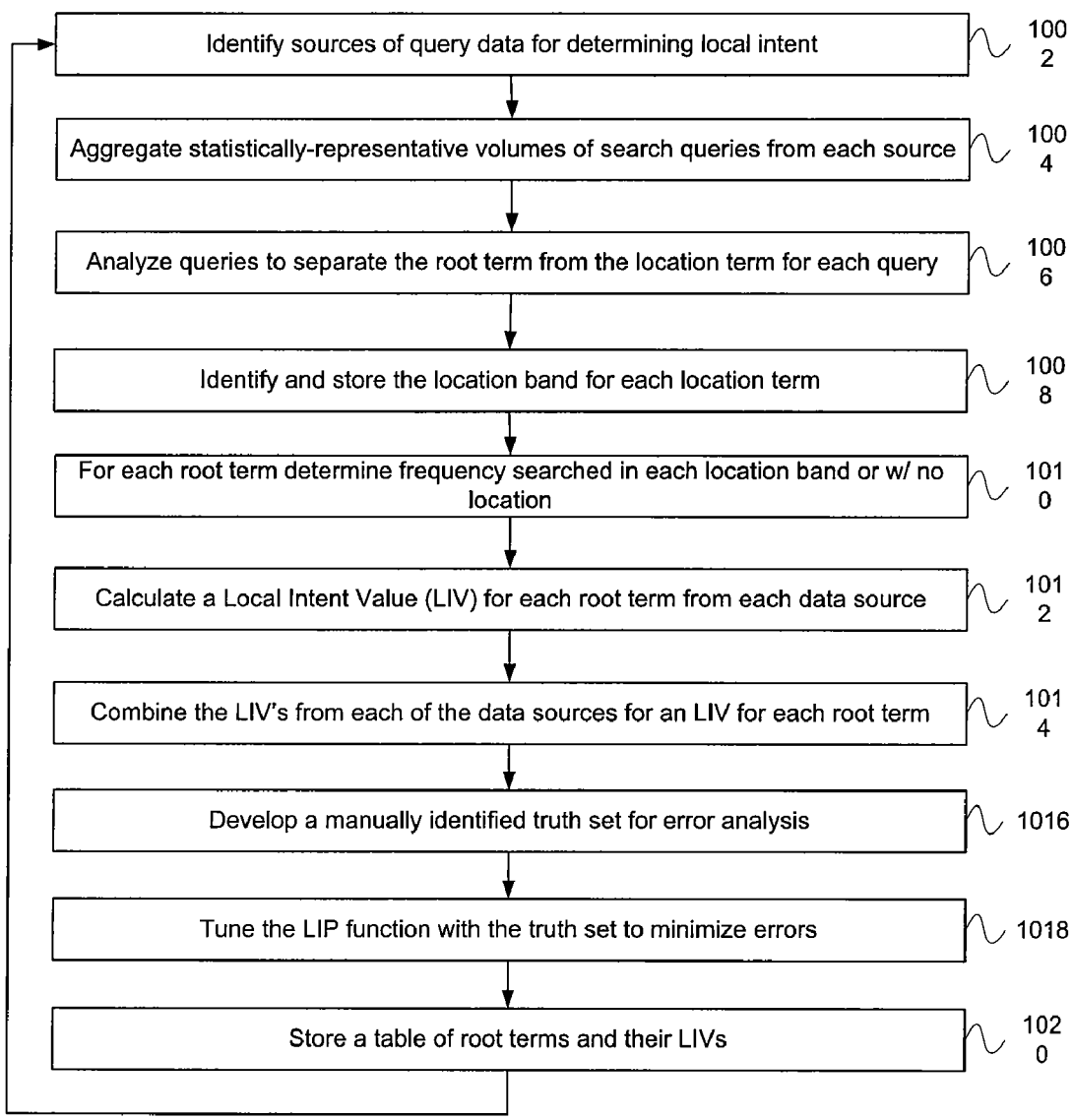
FIG. 10 is a flowchart illustrating the determination of geographic range according to one embodiment.

FIG. 10 is a flowchart illustrating the determination of geographic range according to one embodiment. In particular, FIG. 10 calculates an LIV value as in block 414 of FIG. 4. As described below, the LIV of each root term may be represented as a continuous distribution function and approximated by a discrete probability function in which the discrete values are location bands. This discrete probability function may take multiple data sources as input so that as the number of data sources increases, the confidence of the probability of the LIV improves. An expected value for the LIV of a root term may then be determined for each data source.

In block 1002, data sources containing search query data are located. As described above in block 502 of FIG. 5 and in system 300 for FIG. 3, internal data sources 320 and/or external data sources 322 may be utilized for search query data. The presence of an explicit location may suggest a geographic range which may be used to calculate a LIV. Accordingly, the sources of search query data, such as internal data sources 320 and/or external data sources 322, may be used to determine which explicit locations are commonly associated with which root terms in search queries. A root term that is frequently associated with a narrow geographic range will likely have a higher localness value than a root term that is frequently associated with a large geographic range. Accordingly, the search query data from multiple data sources may be used to develop the LIV for each root term.

In block 1004, large volumes of query data containing users' search behaviors may be captured and assembled for the purpose of determining local intent similar to block 504 of FIG. 5. This user query data may be captured by sampling large volumes of statistically-representative user search queries from multiple user query data sources. Each of the search query data sources may be analyzed to extract a representative set of search queries that may be used in determining local intent.

The queries stored or recorded in the data sources may be analyzed to determine which queries include explicit locations. Queries with explicit locations or explicit local intent may also be referred to as geo-modified queries because they include a location term in addition to a root term. In block 1006, the root term and the location term are separated for each query that includes a location term.

In block 1008, the location band of the explicit location term is determined and stored. In one embodiment the location bands that are available are shown in FIG. 6. The five location bands described with respect to FIG. 6 may be used in the quantification of the LIV. In alternate embodiments, more or fewer location bands may be used in the calculation of the LIV. Explicit search queries having local intent may be analyzed for how often a specific location band appears with the root term as discussed above. The output may be a list of root terms and their respective LIV from 0-5 corresponding to the five location bands from FIG. 6. Terms with higher LIV values, (3-5) have high localness, and those with lower LIV values (1-2), less localness. A LIV value of zero ("0") may indicate zero local intent and that localness does not apply and the root term has no local intent.

Figure 11:
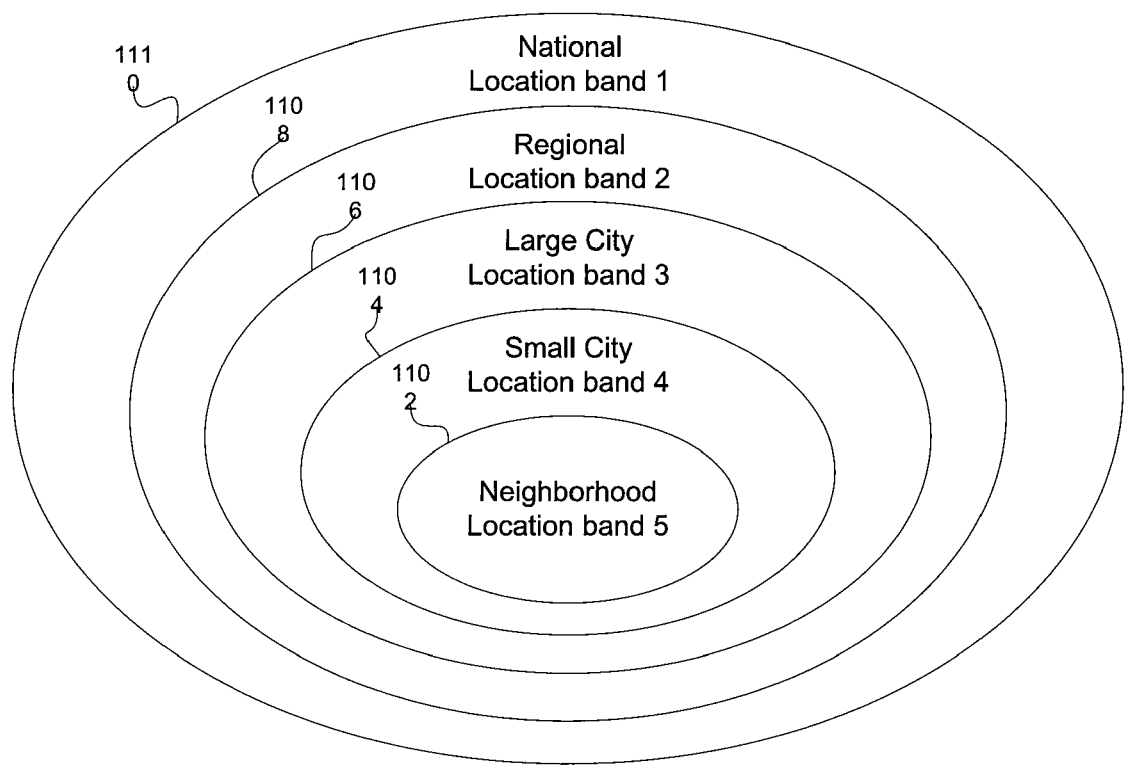
FIG. 11 is a diagram illustrating location bands.

FIG. 11 is an illustration of one embodiment of the location bands. In particular, FIG. 11 illustrates the five location bands that were described with respect to FIG. 6. In one embodiment, the five location bands may be used in the quantification of the LIV. In alternate embodiments, more or fewer location bands may be used in the calculation of the LIV. Explicit search queries having local intent may be analyzed for how often a specific location band appears with the root term as discussed above. The output may be a list of root terms and their respective LIV from 0-5 corresponding to the five location bands shown in FIG. 11.

As shown in FIG. 11, the smallest location band is the fifth location band 1102, which may represent a neighborhood. The fourth location band 1104 may represent a small city and may encompass the smaller location band 1102. The third location band 1106 may represent a large city and may encompass the smaller location bands 1102, 1104. The second location band 1108 may represent a regional area, such as a state, and may encompass the smaller location bands 1102, 1104, and 1106. Finally, the first location band 1110 may represent a national area, such as a country, and may encompass the other location bands.

The larger geographic areas, such as the first location band 1110 have a lower LIV, whereas the smaller geographic areas, such as the fifth location band 1102 has a larger LIV. The localness (and the LIV) increases as the geographic area is narrowed. In one embodiment, for the fifth location band 1102 the LIV=5, for the fourth location band 1104 the LIV=4, for the third location band 1106 the LIV=3, for the second location band 1108 the LIV=2, and for the first location band 1110 the LIV=1.

Referring back to FIG. 10, the location band information from each search query may be used in block 1010 to determine the frequency with which each root term is associated with each of the location bands. For example, the root term "dry cleaners" may be searched with an explicit location term associated with 1) no location or country (location band 1); 2) a State location (location band 2); 3) large city or county (location band 3); 4) small city (location band 4); or 5) neighborhood, zip code, or smaller location (location band 5). The frequency that a location term is searched with the root term is measured and recorded in each location band that is associated with the location term.

Each search query with a location term is analyzed to determine the location band. The location bands are recorded along with the root term that they are associated with. In other words, each search query with a location term has a root term that is associated with a location band that corresponds to the location term. The frequency of each location band for each root term may be recorded in a histogram. FIG. 7 illustrates one example of a histogram that may reflect the percentage or frequency of each location band for a particular root term. In other words, FIG. 7 may show that for a particular root term, there is a percentage by which each location band may be associated with that root term.

In block 1012, the local intent value (LIV) may be calculated based on the search query data of the location bands associated with each root term. In one embodiment, the LIV is calculated by:

LIV (term)=Σ frequency (term, location band i)×locality integer I; where "i" refers to the five location bands (1-5) that are shown and described with respect to FIG. 6. In addition, no location band may be referred to as location band 0 and the value i for no location may be zero.

As one example of the calculation of LIV the following frequency chart may be used that illustrates a root term with the frequency for that term in each location band. This frequency chart corresponds with the visual representation of the location bands shown in Chart 700 of FIG. 7.

| Root term | Country | State | Large city | Small city | Neighborhood |
|---|---|---|---|---|---|
| Delivery Pizza | 0.0% | 5.0% | 29.8% | 20.4% | 44.4% |
| Job | 7.3% | 19.1% | 35.3% | 33.2% | 0.2% |

According to the LIV formula listed above, the LIV may be calculated according to the above formula: LIV(delivery pizza)=0%×1+5.0%×2+29.8%×3+20.4%×4+44.4%×5= 4.03. The LIV for the root term delivery pizza is 4.03, which corresponds to a small city (location band 4) suggesting that the root term "delivery pizza" is most often searched for in the location of a small city. Conversely, for the root term "job" the LIV is calculated as: LIV(job)=7.3%×1+19.1%×2+35.3%× 3+33.2%×4+0.2%×5=2.852. The LIV of 2.852 for the root term "job" is closest to location band three, or a large city. Accordingly, the root term "job" has lower localness than the root term "delivery pizza." The formula described above may provide for the ability to weight how often a term is searched with any location name.

The formula may be expanded to include no location type, which corresponds to a location band of zero. Accordingly, the LIV formula may be expanded to a probability distribution formula: LIV=ΣProbability (term, location band i)*Expected Value (term, location band i)+Probability (term, no location)*Expected Value (term, no location band). The probability distribution formula may be an extension to the LIV formula described above. Probability(term, no location) may be a statistical estimate of the percentage of occurrences of a term without location name. Expected value(term, no location band) may a default value for the local intent value (LIV) in the absence of any query with location names. Different source tags may be utilized to determine the default value, at least partly based on the relative frequency of the term for source tags.

The way in which queries for a particular term are weighted and used in any of the LIV functions may differ. The weighting and functions that are used may vary and may depend on the search data that is available. In addition, the formulas may be modified over time to more accurately determine the local intent of users.

In one embodiment, a different LIV may be calculated for each of the data sources that are available. Accordingly, in block 1014, the LIV from each data source may be combined and/or averaged to get an overall LIV score. The formula described above may be expanded to account for multiple data sources. Accordingly, the LIV formula may be expanded to a probability distribution formula: LIV=ΣΣProbability (term, location band i, source j)*Expected Value (term, location band i, source j)+Probability (term, no location)*Expected Value (term, no location band). The variable "i" refers to each location band, and "j" refers to the potential sources of frequency data. The summations are over variables "i" and "j." Alternatively, the formula may be LIV=f (probability term, location band i, source j)+error, where the variable "i" refers to each location band, and "j" refers to each source of frequency data.

A manually identified truth set may be developed for error analysis in block 1016. An editorial truth set may be established in which editors may manually identify the local intent of a large sample of terms. Using one of the tunable probability models with error functions as discussed above may allow for the tuning of model parameters to replicate or exceed the precision and recall of the editorially-controlled truth set. The truth set may minimize the error function. Accordingly, each additional data source that contributes to the calculation of the local intent probability of each term may be refined. In block 1018, the LIP function is tuned with the truth set to minimize errors.

In block 1020, the root terms and corresponding LIV's may be stored in a table or list. In one embodiment, the list is stored in the user query database 326. The user query database 326 may include a list of all root terms from the search query data sources as well as associated location terms, associated location bands, frequency of the term in each location band, LIP and LIV. Alternatively, each root term may be stored with only the LIV.

The LIV formulas may be adapted to include additional data and information to increase the predictive value for each LIV. For example, algorithms may account for demographics and time/day. In addition, algorithms may consider the context of the property in which the term is being searched, such as mobile versus local news versus national news.

As discussed below, queries that have high local intent values may have the user location geo-modified at a smaller city or neighborhood level. Those queries may receive search results in which local/neighborhood geography may be weighted more heavily. Queries that have medium or low local intent values may have the user location geo-modified with a larger city metro level. Those queries may receive search results in which geography is moderately weighted or combined with national advertising. Queries that have no local intent will not have the user location geo-modified with any location type and will receive search results in which geography is not weighted at all, thus only contextually relevant or topic-driven advertising will be served.

Referring back to FIG. 1, after the geographic range is quantified in block 104, geographically and contextually relevant information may be provided in block 106. Specifically, the search engine 304 and/or the advertisement provider 306 may select the appropriate search results, media, information, and/or advertisements to be displayed on the user device 302 in response to a search query. The advertisement provider 306 would like to provide geographically targeted advertisements, which may be more effective based on the recognition of local intent and an identification and quantification of the geographic range of the local intent. In addition, it may not be possible to exactly match the geographic range of a query, so it may be necessary to expand the geographic range or select geographic neighbors when relevant. For example, the advertisements that may be shown for a search query on "Los Angeles dentists" are related to the query "Santa Monica dentists." Accordingly, an advertisement or other content that is associated with "Santa Monica" may be displayed for a search query of "Los Angeles dentist," if there advertisements or content specific to Los Angeles are not available. It may be necessary to determine and select the most geographically relevant information and advertisements based on what is available.

Referring back to FIG. 4, the geographic range of LW is calculated in block 414 as described above with respect to FIG. 10. After the LIV is calculated, geo-relevant media and advertising may be found in block 416. In one embodiment, the LW is used to determine which media and advertisements are geographically relevant.

Figure 12:
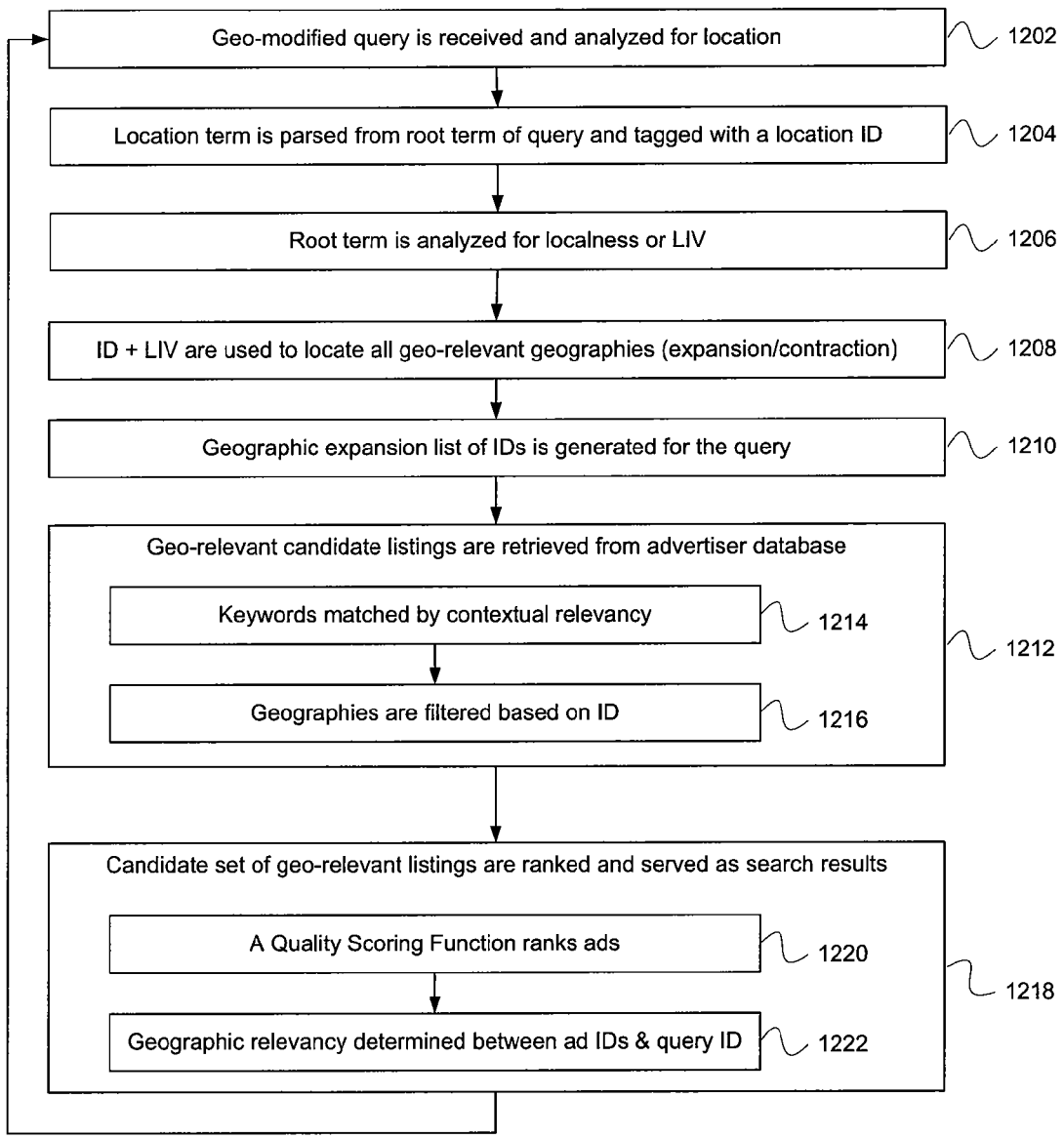
FIG. 12 is a flowchart illustrating the use of geographic range according to one embodiment.

FIG. 12 is a flowchart illustrating the use of geographic range according to one embodiment. In particular, FIG. 12 illustrates providing a response to a search query that includes providing geographically relevant media and advertisements. In block 1202, a query is received and analyzed for geography or local intent. As discussed above in blocks 404 and 414 of FIG. 4, the local intent and the range of that local intent may be determined, such as in the intent determiner 314 and localness calculator 316 of FIG. 3. That information may be used to identify a location. That identified location may then become a part of the query in block 1202, such that the query may be referred to as a geo-modified query. A geo-modified query may include a location term or the root term may have high local intent. The geo-modification of the query may be the association of a location with the query.

In alternate embodiments, the identification of a location in block 1202 may be determined differently. In one embodiment, U.S. Patent Publication No. 2005/0060430, published Mar. 17, 2005, entitled "METHOD OF DETERMINING A LIKELY GEOGRAPHICAL LOCATION," which is incorporated by reference herein, determines the likely geographic location based on submitted criteria. In addition, U.S. Patent Publication No. 2005/0108213, published May 19, 2005, entitled "GEOGRAPHICAL LOCATION EXTRACTION," which is incorporated by reference herein, infers a likely geographical location from one or more search terms. In one embodiment, the location may be determined based on the users IP address as in U.S. Patent Publication No. 2005/0108244, published May 19, 2005, entitled "METHOD OF DETERMINING GEOGRAPHICAL LOCATION FROM IP ADDRESS INFORMATION," which is incorporated by reference herein. For a search performed on a mobile device, the geographic location may be determined as in U.S. Patent Publication No. 2005/0003835, published Jan. 6, 2005, entitled "METHOD OF PROVIDING LOCATION BASED INFORMATION TO A MOBILE-TERMINAL WITHIN A COMMUNICATIONS NETWORK," which is incorporated by reference herein.

In block 1204, the identified location is removed from the root term of the query and is given a location identifier. The root term may be removed from the location term by the location extractor 312 in FIG. 3, as described above. The location term is parsed and used for tagging the query with a location. The location tagging may also be referred to as a geographic identifier, location identifier, or geographic tag. In one embodiment, the location tagger 318 is in the local intent analyzer 310 of FIG. 3, and may perform the location tagging using a geographic database 328 that includes location identifiers for various locations.

The location identifier may be a unique identification for any location. In one embodiment, each city, town, county, zip code, and state in the United States is associated with a unique location identifier. An example of assigning location identifiers is described in U.S. Patent Publication No. 2006/0004797, published Jan. 5, 2006, entitled "GEOGRAPHICAL LOCATION INDEXING," which is hereby incorporated by reference. That application describes zones that are represented by location identifiers that establish relationships and overlap with adjacent zones.

Figure 13:
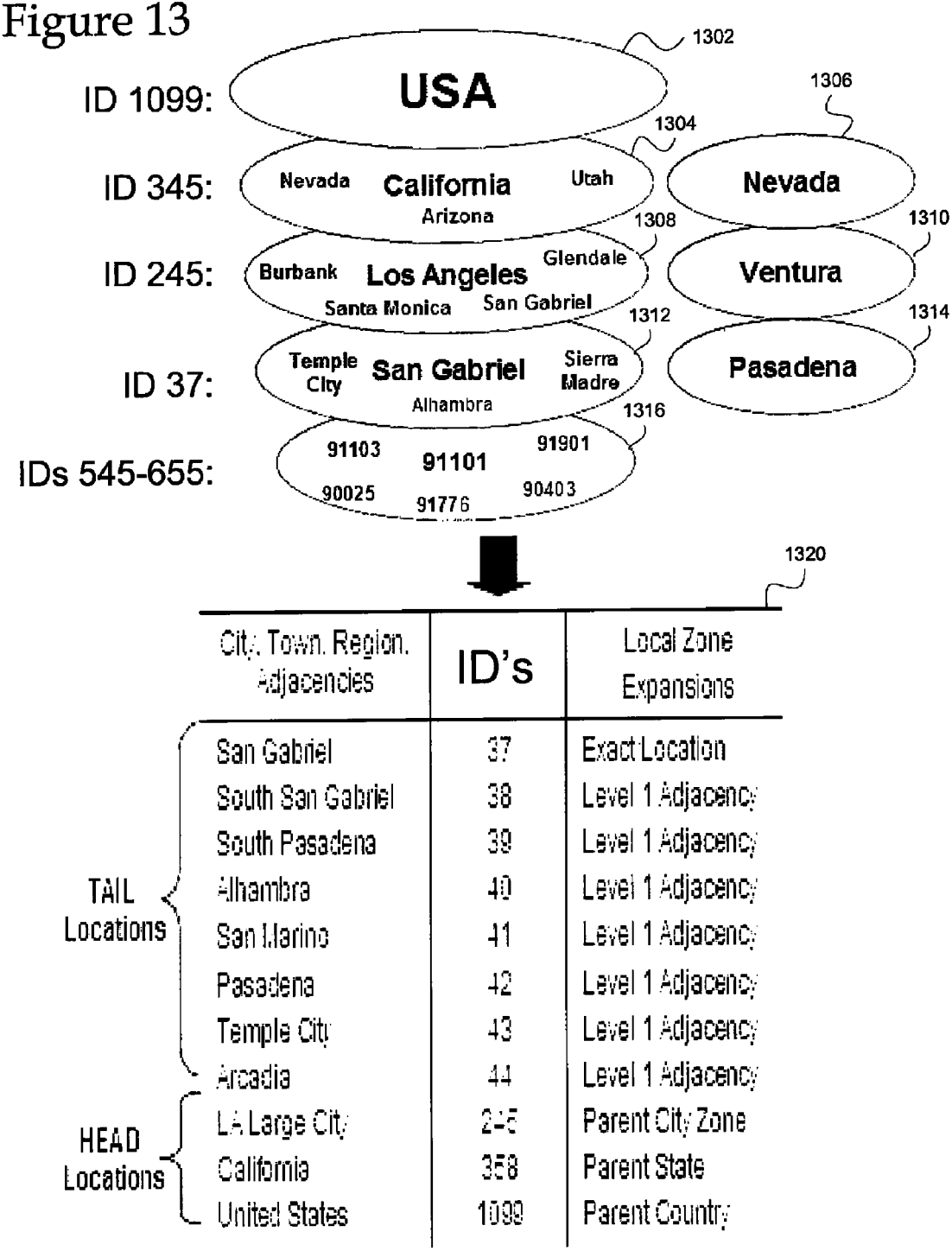
FIG. 13 is an illustration of location identification.

The location identifier may be used to record adjacencies between locations. In addition the location identifier may also be used to identify a parent location or child locations. In one embodiment, the location identifiers and the relationships between locations may be categorized as described with respect to FIG. 6 and FIG. 11. FIG. 13 illustrates one embodiment of location identification. In particular, FIG. 13 illustrates five location bands that may be used to define the relationships between locations, such as adjacent locations, or parent/child locations. The country location 1302 is the broadest location in that it covers a country, such as the United States. It is labeled with location identifier 1099. Country location 1302 is a parent location for all the states and is a grandparent location to all other locations below the states. State location 1304 is a child location of the country location 1302. State location 1304 represents California, which is labeled with location identifier 345. Also shown is an adjacent state location 1306 that represents Nevada. The location identifier of 345 for California may be associated with all adjacent states, such as Nevada, Ariz., and Utah as shown in state location 1304. The child location of the state location 1304 is the large city location 1308. The city of Los Angeles is identified by location identifier 245. The location identifier of 245 is associated with its parent locations, California (345) and USA (1099). In addition, it may be associated with adjacent cities, such as Burbank, Santa Monica, San Gabriel, and Glendale. In particular, adjacent large city location 1310 Ventura is shown.

One example of a child location for a large city location 1308 is a small city location 1312. As shown, San Gabriel is a smaller city identified by location identifier 37. Adjacent smaller cities that are associated with location identifier 37 are Temple City, Alhambra, and Sierra Madre. In addition, the adjacent small city location 1314 of Pasadena is shown. San Gabriel is a child location of Los Angeles. Child locations of a small city location 1312 may include zip code locations 1316. In an alternative embodiment, the child locations of a small city location 1312 may include specific points of interest or neighborhoods as described above.

The chart 1320 in FIG. 13 illustrates the location identifiers of some of the locations in FIG. 13. In particular, the chart 1320 assumes that the exact location is the smaller city of San Gabriel, which has location identifier 37. As shown in the chart 1320, the parent city zone is Los Angeles (identifier 245), the parent state is California (identifier 358), and the parent country is the United States (identifier 1099). Each of these parent locations may be referred to as head locations because they overlap or subsume the exact location in question, which is San Gabriel. Conversely, tail locations are those which are adjacent the exact location or are child locations. As shown in chart 1320, the adjacent or tail locations of San Gabriel include South San Gabriel, South Pasadena, Alhambra, San Marino, Pasadena, Temple City, and Arcadia. Each of the adjacent cities are associated with a unique location identifier. Accordingly, the location identifier 37 of San Gabriel may be associated with all of the head locations and the tail locations. Accordingly, a database, such as the geographic database 328 may include a listing of every location identifier as well as the relationships between the location identifiers. For example, the head locations and the tail locations for each location identifier may be recorded in the geographic database 328. Accordingly, referencing any of the location identifiers stored in the database will allow for easy access to all parent, child and adjacent locations.

Accordingly, in block 1204 of FIG. 12, the location term of a search query may be parsed and tagged with a location identifier. That location identifier may then be used in displaying search results, relevant content and advertisements that are targeted based on the location. In block 1206, the root term is analyzed for localness, which may be based on a local intent value (LIV). As described above, in block 1202, a location is identified for a query and/or for the user. Localness or LIV is a measure of the geographic range of that location. As discussed above, certain queries such as "dry cleaning" have a higher localness or LIV than other queries, such as "used car dealers."

The localness value may be used to determine which locations are included for the providing of search results, content and/or advertisements as in block 1208. The location identifier is used to identify an exact location as discussed with respect to FIG. 13. That exact location may be a country, state, large city, small city, zip code, point of interest or other location. The exact location may determine or influence the localness. In block 1208, a determination is made for any expansion or contraction of the geographic area that is relevant based on the search query. An exact location of a state may result in an expansion to other states (adjacent locations) or a contraction to a selection of certain areas within that state, such as its child locations. Conversely, an exact location of a small town may be expanded all the way out to the state level to include parent locations. Accordingly, the localness of the search query combined with the location identifier may be used to expand or contract the relevant geographic area.

In one embodiment, if the localness or LIV is high, which suggests a smaller geographic range, then the relevant geographies may be contracted to find locations in that range. For example, if the LIV is a small city and the location associated with an advertisement is at the state level, then the small city location is expanded to its parent locations to select relevant advertisements. Accordingly, the location identifier may be used for the expansion of geographies to cover adjacent locations, parent locations, or child locations. The expansion down to child locations may be referred to as contraction.

In block 1210, location identifiers are used for an expansion of the geographic area. In one embodiment, an expansion list of location identifiers is generated based on the exact location identifier. As discussed above, the geographic database 328 may include relationships between parent, child, and/or adjacent locations. Accordingly, an expansion may include all adjacent locations and/or the parent location. The expansion or contraction may be based on the available search results, content, and/or advertisements. For example, advertisements may only be available on the large city level. Accordingly, if the exact location is a small city, then expansion of that location may give a large city location that is associated with an advertisement. In one embodiment, the available advertisements may only be related to certain areas. For example, if the only advertisements that are associated with Illinois relate to Chicago, then if the exact location is Peoria, Ill., expansion into the parent location of Illinois may result in Chicago advertisements being displayed. Likewise, the expansion of Peoria, Ill. into adjacent locations may also result in Chicago advertisements being displayed.

In block 1212, geo-relevant advertisement candidate listings are retrieved from the advertiser database. In one embodiment, the listings are stored in the advertiser database 336 discussed with respect to FIG. 3. In alternate embodiments, the candidate listings may include search results or other content that is geo-relevant and/or targeted based on the location, but as discussed below refers to candidates for advertisements. In block 1214, the root term of the query is first matched by contextual relevancy when selecting targeted search results and/or advertisements. In block 1216, the contextually relevant results may then be filtered based on the exact location or the location identifier associated with the query and/or the location term. The filtering may be accomplished by the advertisement filter 330 in FIG. 3. As a result, a set of potentially relevant advertisements may be established based on contextual and/or geographic relevance. The set of candidates may then be filtered for selection of at least one relevant advertisement to be displayed with the search results.

In block 1218, the candidate set of geo-relevant listings may be ranked. The candidate set may be relevant advertisements or may be search results or other content. In one embodiment, a quality scoring function may rank the candidate set as in block 1220. The quality scoring function may weigh an advertisements relative bid for the advertisement, as well as a willingness to pay to the marketplace, click-thru-rate, and overall advertisement relevancy.

The quality scoring function may be used for scoring which relevant advertisements may appear first in response to a user query having local intent. Any quality scoring function may be used to rank the advertisements and to improve geo-relevancy of the relevant advertisements. In one example, the rank of an advertiser may determined based on the advertisement's eCPM value which may be defined as f(quality score)×g(bid) value. eCPM may represent effective clicks per thousand, which determines when a user clicks on an advertisement. The quality score may be a linear function of machine learning search algorithmic relevancy, which may include past click through data. The quality score may further relate to local intent and advertiser geo-relevancy factors, such that ads are ranked and served once eCPM values are calculated for each query. In one embodiment, advertisement services are described in U.S. Patent Publication No. 2006/0282314 A1, published Dec. 14, 2006, entitled "UNIVERSAL ADVERTISEMENT SERVICES ARCHITECTURE," which is incorporated by reference herein.

The geographic relevancy may also be an input to the quality scoring function. In block 1222, geographic relevancy may be an input based on physical proximity and/or spatial proximity between a user's local intent and an advertisers' geo-targeting intent. Proximity measure may be multi-dimensional which may effectively encapsulate several factors such as business context (e.g. in/out service tendency), local shopping intent, inventory availability, willingness to drive/walk, and/or traffic/density conditions. Proximity may be calculated on these numerous factors for a given candidate advertisement and user search query.

Figure 14:
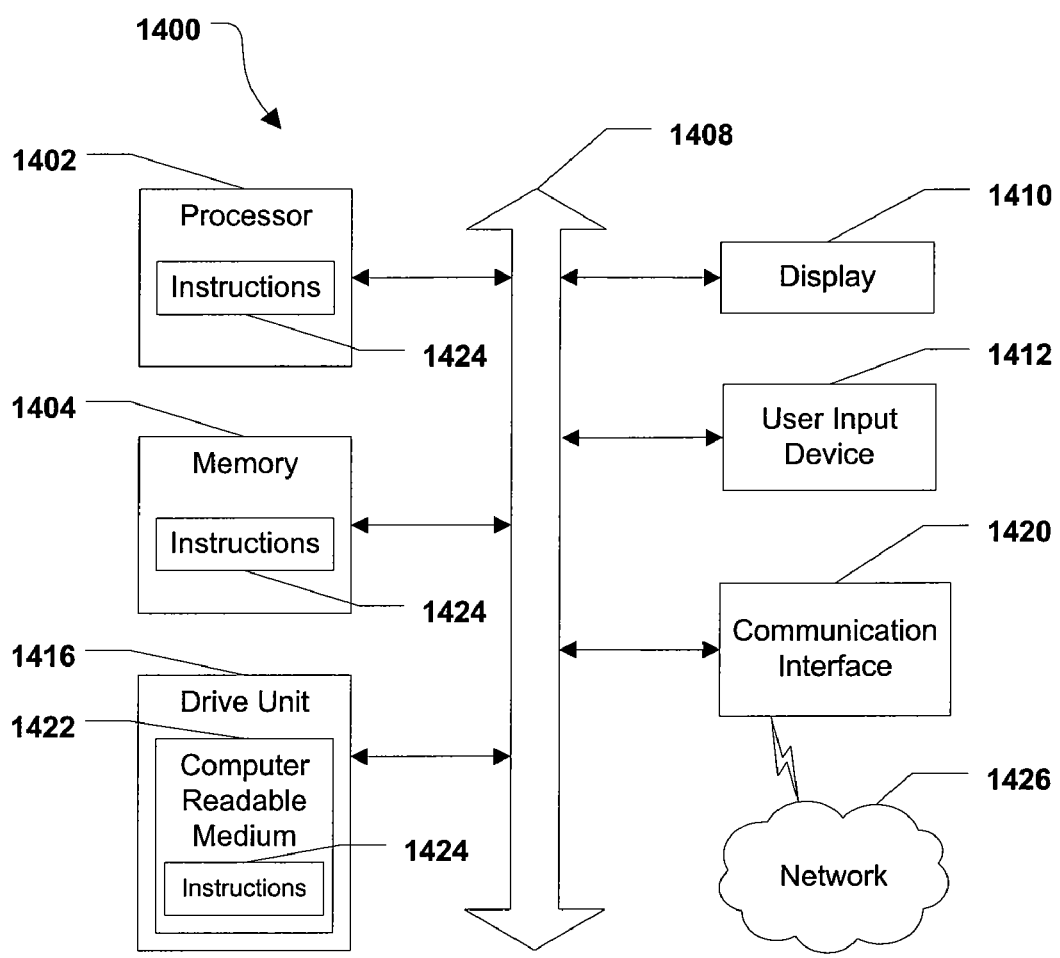
FIG. 14 is an illustration a general computer system.

Referring to FIG. 14, an illustrative embodiment of a general computer system is shown and is designated 1400. Any of the components shown in the computer system 1400 may describe the components discussed with respect to FIG. 2 and FIG. 3. For example, the search engine and/or the local intent analyzer may include a processor, memory, and/or drive unit as described below. The computer system 1400 can include a set of instructions that can be executed to cause the computer system 1400 to perform any one or more of the methods or computer based functions disclosed herein. The computer system 1400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1400 can be implemented using electronic devices that provide voice, video or data communication. Further, while a single computer system 1400 is illustrated, the term "system" shall also be taken to include any collection of systems or sub-systems that individually or jointly execute a set, or multiple sets, of instructions to perform one or more computer functions.

As illustrated in FIG. 14, the computer system 1400 may include a processor 1402, e.g., a central processing unit (CPU), a graphics processing unit (GPU), or both. The processor 1402 may be a component in a variety of systems. For example, the processor 1402 may be part of a standard personal computer or a workstation. The processor 1402 may be one or more general processors, digital signal processors, application specific integrated circuits, field programmable gate arrays, servers, networks, digital circuits, analog circuits, combinations thereof, or other now known or later developed devices for analyzing and processing data. The processor 1402 may implement a software program, such as code generated manually (i.e., programmed).

The computer system 1400 may include a memory 1404 that can communicate via a bus 1408. The memory 1404 may be a main memory, a static memory, or a dynamic memory. The memory 1404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 1404 includes a cache or random access memory for the processor 1402. In alternative embodiments, the memory 1404 is separate from the processor 1402, such as a cache memory of a processor, the system memory, or other memory. The memory 1404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1404 is operable to store instructions executable by the processor 1402. The functions, acts or tasks illustrated in the figures or described herein may be performed by the programmed processor 1402 executing the instructions stored in the memory 1404. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multi-processing, multitasking, parallel processing and the like.

As shown, the computer system 1400 may further include a display unit 1414, such as a liquid crystal display (LCD), an organic light emitting diode (OLED), a flat panel display, a solid state display, a cathode ray tube (CRT), a projector, a printer or other now known or later developed display device for outputting determined information. The display 1414 may act as an interface for the user to see the functioning of the processor 1402, or specifically as an interface with the software stored in the memory 1404 or in the drive unit 1406.

Additionally, the computer system 1400 may include an input device 1416 configured to allow a user to interact with any of the components of system 1400. The input device 1416 may be a number pad, a keyboard, or a cursor control device, such as a mouse, or a joystick, touch screen display, remote control or any other device operative to interact with the system 1400.

In a particular embodiment, as depicted in FIG. 14, the computer system 1400 may also include a disk or optical drive unit 1406. The disk drive unit 1406 may include a computer-readable medium 1410 in which one or more sets of instructions 1412, e.g. software, can be embedded. Further, the instructions 1412 may embody one or more of the methods or logic as described herein. In a particular embodiment, the instructions 1412 may reside completely, or at least partially, within the memory 1404 and/or within the processor 1402 during execution by the computer system 1400. The memory 1404 and the processor 1402 also may include computer-readable media as discussed above.

The present disclosure contemplates a computer-readable medium that includes instructions 1412 or receives and executes instructions 1412 responsive to a propagated signal, so that a device connected to a network 1420 can communicate voice, video, audio, images or any other data over the network 1420. Further, the instructions 1412 may be transmitted or received over the network 1420 via a communication port 1418. The communication port 1418 may be a part of the processor 1402 or may be a separate component. The communication port 1418 may be created in software or may be a physical connection in hardware. The communication port 1418 is configured to connect with a network 1420, external media, the display 1414, or any other components in system 1400, or combinations thereof. The connection with the network 1420 may be a physical connection, such as a wired Ethernet connection or may be established wirelessly as discussed below. Likewise, the additional connections with other components of the system 1400 may be physical connections or may be established wirelessly.

The network 1420 may include wired networks, wireless networks, or combinations thereof. The wireless network may be a cellular telephone network, an 802.11, 802.16, 802.20, or WiMax network. Further, the network 1420 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. In a computer readable storage medium having stored therein data representing instructions executable by a programmed processor for analyzing a location and geographic range of a search query, the storage medium comprising instructions operative for:

receiving the search query;

identifying a root term from the search query;

accessing a query history of the root term from a root term database, wherein the query history includes locations and geographic ranges associated with each root term stored in the root term database; and analyzing the query history of the root term including each of the locations and geographic ranges stored in the query history that are associated with the root term from the search query;

determining, based on the analysis, the geographic range for the search query based on any locations or geographic ranges stored in the root term database for the root term from the search query.

2. The storage medium of claim 1 wherein the geographic range is determined based on a plurality of frequencies by which the root term is associated with a plurality of location bands in the query history of the root term, further wherein one of the plurality of frequencies of the root term is associated with one of the plurality of location bands.

3. The storage medium of claim 2 wherein the geographic range determination further comprises:

assigning a value for each of the location bands, wherein the values represent a geographic range;

multiplying the frequency in each of the location bands with the value of the location band associated with that frequency; and combining the multiplied values for the root term to form a local intent value, wherein the local intent value determines the geographic range.

4. A system for determining a geographic range of a search query comprising:

a search engine coupled with a network and configured to receive the search query over the network;

an extractor coupled with the search engine and configured to extract a root term from the search query and to extract a location term from the search query when the search query includes a location term;

a processor coupled with the search engine and the extractor that is configured to determine a geographic range of the search query, wherein the determination is based on the location term when the search query includes the location term; and a database coupled with the calculator and configured to store root terms extracted from a plurality of search queries and configured to store location terms associated with the stored root terms;

wherein, when the search query does not include the location term, the processor determines the geographic range for the root term from associations stored in the database.

5. The system of claim 4 further comprising a tagger coupled with the processor and configured to assign a value to each of the location terms, wherein the value is representative of the geographic range.

6. The system of claim 5 wherein the processor determines the geographic range based on the location terms stored in the database that are associated with the root term from the search query.

7. The system of claim 4 further comprising:

a content provider coupled with the search engine and configured to provide content in response to the search query; and a matching engine coupled with the content provider and configured to compare the search query with the content available from the content provider.

8. The system of claim 7 wherein the content provider comprises an advertisement provider, further wherein the content provided is at least one advertisement.

9. The system of claim 8 wherein the at least one advertisement is geographically relevant based on the determined geographic range.

10. The system of claim 7 further comprising a user device coupled with the network and configured to receive the provided content over the network in response to submitting the search query.

11. The system of claim 4 further comprising at least one of an internal data source or an external data source coupled with the database and configured to provide the plurality of search queries.

12. A method for compiling geographic associations for search queries comprising:

accessing a volume of search queries;

identifying a root term and, when present, a location term for each of the queries from the volume of search queries;

determining a local intent or a geographic range for the root term based on the location term for that query; and generating a root term database that includes the identified root terms and the local intent or the geographic range associated with the identified root term.

13. The method of claim 12 wherein the volume of search queries are captured from prior search queries.

14. The method of claim 13 wherein the prior search queries comprise queries that are received over a period of time that are added to the volume of search queries.

15. The method of claim 12 wherein a source of the prior search queries comprises a web search engine.

16. The method of claim 15 wherein a source of the prior search queries comprises a local search engine.

17. The method of claim 16 wherein a location is identified from the local search engine for local searches and that location determine the local intent or the geographic range for each of the local searches.

18. The method of claim 12 wherein the location terms comprise an explicit location included as part of a search query.

19. The method of claim 12 wherein the local intent or the geographic range for the root term is determined implicitly when no location term is explicitly included with that root term.

20. The method of claim 19 wherein the implicit determination comprises identifying prior local intent or geographic range associations with the root term from other search queries.

* * * * *